US011394933B2

(12) United States Patent
Correnti et al.

(10) Patent No.: US 11,394,933 B2
(45) Date of Patent: Jul. 19, 2022

(54) SYSTEM AND METHOD FOR GATE MONITORING DURING DEPARTURE OR ARRIVAL OF AN AUTONOMOUS VEHICLE

(71) Applicant: Alarm.com Incorporated, Tysons, VA (US)

(72) Inventors: Matthew Daniel Correnti, Reston, VA (US); Karen Correnti, Reston, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 17/101,874

(22) Filed: Nov. 23, 2020

(65) Prior Publication Data
US 2021/0076010 A1  Mar. 11, 2021

Related U.S. Application Data

(63) Continuation of application No. 16/130,960, filed on Sep. 13, 2018, now Pat. No. 10,848,719.
(Continued)

(51) Int. Cl.
*H04N 7/18* (2006.01)
*G08B 13/196* (2006.01)
(Continued)

(52) U.S. Cl.
CPC .............. *H04N 7/188* (2013.01); *G06V 20/52* (2022.01); *G06V 20/593* (2022.01);
(Continued)

(58) Field of Classification Search
CPC ........... G06K 9/00288; G06K 9/00369; G06K 9/00771; G06K 9/00838; G08B 13/196;
(Continued)

(56) References Cited

U.S. PATENT DOCUMENTS 7,440,585 B2   10/2008  Roh et al.
10,007,262 B1   6/2018  Schwindt
(Continued)

FOREIGN PATENT DOCUMENTS

DE      102014221771         4/2016
WO      WO-2016109482 A1 *   7/2016  ............ B60W 50/14
WO      WO 2016/145447       9/2016

OTHER PUBLICATIONS

PCT International Search Report in International Application No. PCT/US2018/050960, dated Dec. 19, 2018, 14 pages.

*Primary Examiner* — Peet Dhillon
(74) *Attorney, Agent, or Firm* — Fish & Richardson P.C.

(57) ABSTRACT

Methods, systems, and apparatus, including computer programs encoded on a storage device, for monitoring a vehicle access point. In one aspect, a monitoring system is disclosed that includes a processor and a computer storage media storing instructions that, when executed by the processor, cause the processor to perform operations. The operations may include obtaining, by the monitoring system, monitoring system data that is generated by a first monitoring system component, determining, by the monitoring system and based on the monitoring system data, a current occupancy of a vehicle, determining, by the monitoring system and based on the current occupancy of the vehicle, whether a vehicle access point is to be monitored, and in response to determining, by the monitoring system and based on the current occupancy of the vehicle, that the vehicle is not occupied by a human occupant, using one or more second monitoring system components to monitor the vehicle access point.

20 Claims, 8 Drawing Sheets

Related U.S. Application Data

(60) Provisional application No. 62/558,080, filed on Sep. 13, 2017.

(51) Int. Cl.
  *G08B 15/00* (2006.01)
  *G06V 20/52* (2022.01)
  *G06V 20/59* (2022.01)
  *G06V 40/10* (2022.01)
  *G06V 40/16* (2022.01)

(52) U.S. Cl.
  CPC .......... *G06V 40/103* (2022.01); *G06V 40/172* (2022.01); *G08B 13/196* (2013.01); *G08B 13/1965* (2013.01); *G08B 13/19613* (2013.01); *G08B 15/00* (2013.01)

(58) Field of Classification Search
  CPC .......... G08B 13/19613; G08B 13/1965; G08B 15/00; H04N 7/188; G06V 20/593
  See application file for complete search history.

(56) References Cited

U.S. PATENT DOCUMENTS

| | | | |
|---|---|---|---|
| 2002/0140555 A1* | 10/2002 | Jette | E05F 15/74 340/540 |
| 2006/0015398 A1* | 1/2006 | Weik | B60R 25/305 705/13 |
| 2014/0306799 A1* | 10/2014 | Ricci | H04W 4/21 340/5.83 |
| 2015/0346718 A1 | 12/2015 | Stenneth | |
| 2015/0346727 A1 | 12/2015 | Ramanujam | |
| 2017/0080900 A1* | 3/2017 | Huennekens | G05D 1/0212 |
| 2017/0090480 A1 | 3/2017 | Ho et al. | |
| 2017/0092109 A1 | 3/2017 | Trundle et al. | |
| 2017/0217372 A1* | 8/2017 | Lu | H04N 5/23293 |
| 2017/0267256 A1 | 9/2017 | Minster et al. | |
| 2017/0309177 A1* | 10/2017 | Hoffmann | G08G 1/127 |
| 2018/0164798 A1 | 6/2018 | Poeppel et al. | |
| 2018/0224844 A1 | 8/2018 | Zhang et al. | |

* cited by examiner

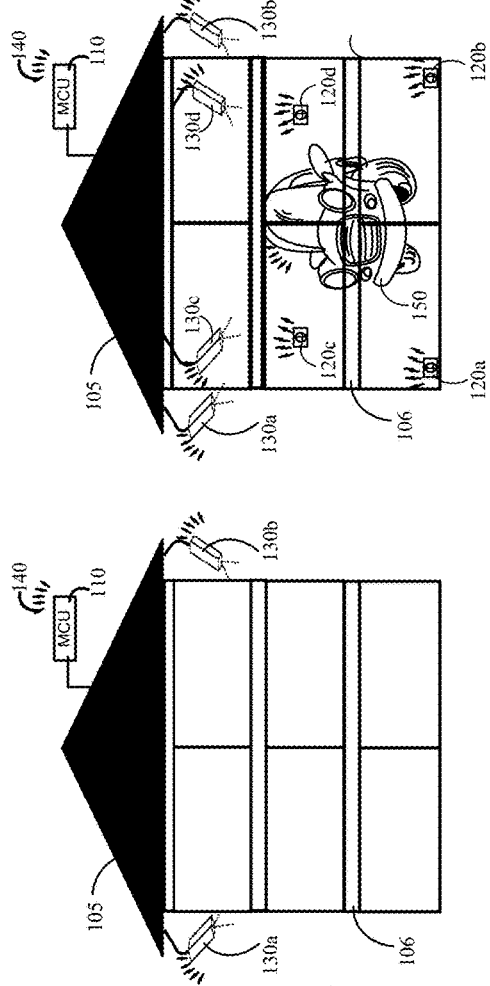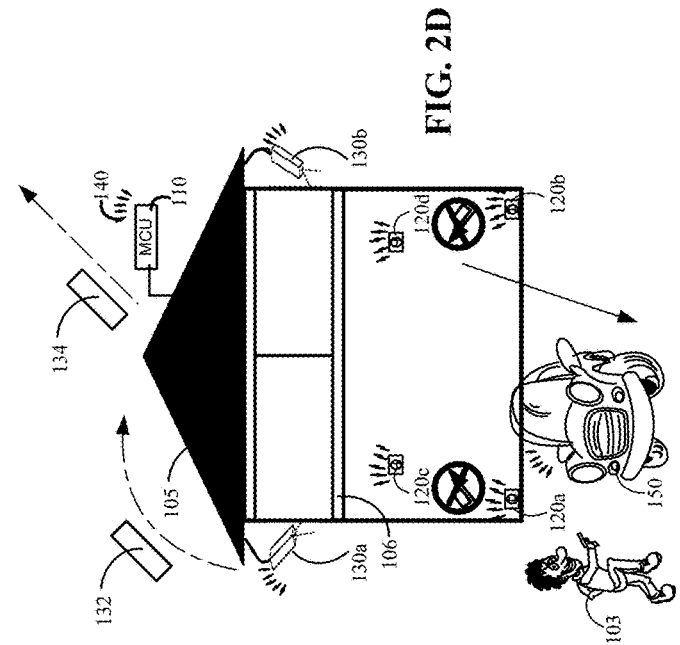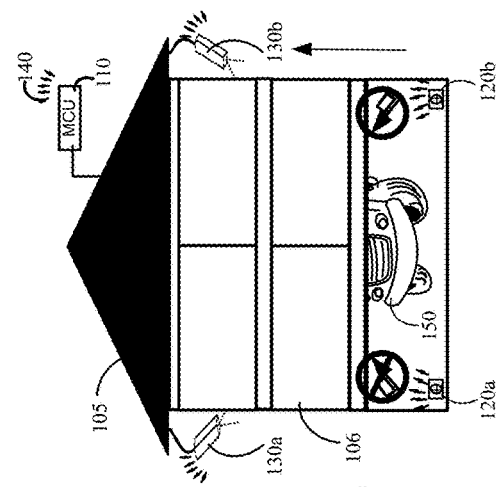

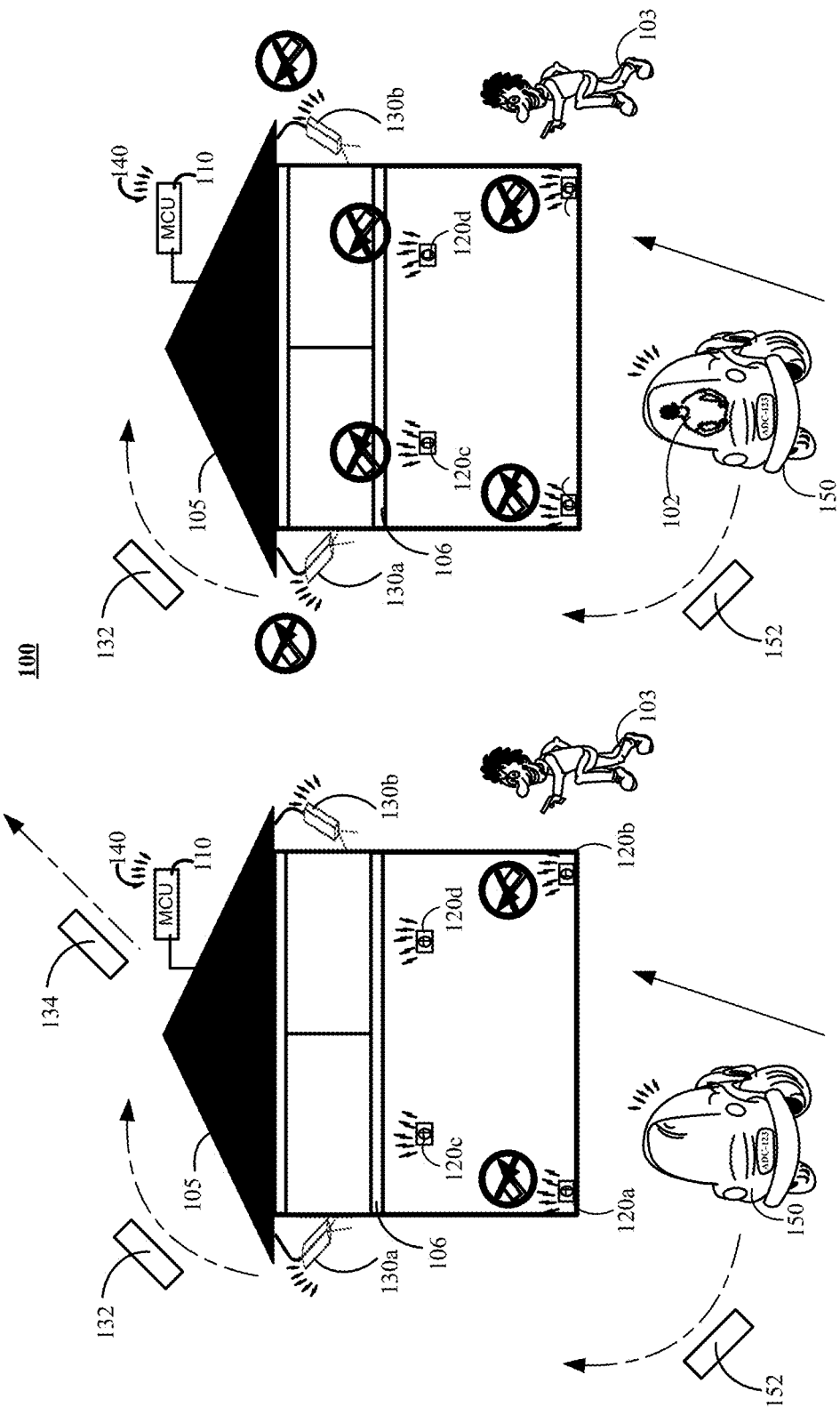

SYSTEM AND METHOD FOR GATE MONITORING DURING DEPARTURE OR ARRIVAL OF AN AUTONOMOUS VEHICLE

CROSS-REFERENCE TO RELATED APPLICATIONS

This application is a continuation of U.S. application Ser. No. 16/130,960, filed Sep. 13, 2018, now allowed, which claims the benefit of U.S. Provisional Patent Application No. 62/558,080 filed Sep. 13, 2017 and entitled "System and Method for Gate Monitoring during Departure or Arrival of an Autonomous Vehicle," which is incorporated herein by reference in its entirety.

BACKGROUND

Autonomous vehicles are becoming a reality. These vehicles will have a substantial impact on a variety of industries. For example, autonomous vehicles may be configured to execute a variety of tasks such as automated parking, running errands (e.g., picking up groceries, picking up kids for daycare, driving into a shop for routine vehicle maintenance, etc.) for their owner, earning money as a driverless taxi, etc. Such autonomous vehicles can create challenges for a monitoring system installed at a property.

SUMMARY

According to one innovative aspect of the present disclosure, a system for monitoring a vehicle access point during departure and arrival of an autonomous vehicle is disclosed. In one aspect, the monitoring system for monitoring a property may include one or more processors and one or more computer storage media storing instructions that are operable, when executed by the one or more processors, to cause the one or more processors to perform operations. In some implementations, the operations may include obtaining, by the monitoring system, monitoring system data that is generated by one or more first monitoring system components, determining, by the monitoring system and based on the monitoring system data, a current occupancy of a vehicle, determining, by the monitoring system and based on the current occupancy of the vehicle, whether a vehicle access point is to be monitored, and in response to determining, by the monitoring system and based on the current occupancy of the vehicle, that the vehicle is not occupied by a human occupant, using one or more second monitoring system components to monitor the vehicle access point.

Other aspects include corresponding methods, apparatus, and computer programs to perform actions of methods defined by instructions encoded on computer storage devices.

These and other versions may optionally include one or more of the following features. For instance, in some implementations, the operations may further include in response to determining, by the monitoring system and based on the current occupancy of the vehicle, that the vehicle is occupied by a human occupant, determining, whether the human occupant is an authorized human occupant and in response to determining, by the monitoring system, that the human occupant is not an unauthorized human occupant, triggering the performance of one or more security operations.

In some implementations, the one or more security operations may include (i) transmitting an alert message to one or more other components of the monitoring system that alerts the one or more other components of the monitoring system of the detection of the unauthorized human occupant, (ii) transmitting an alert message to a user device that alerts the user of the user device of the detection of the unauthorized human occupant, (iii) transmitting an instruction that triggers an audible alarm at the property, (iv) transmitting a notification to one or more law enforcement agencies indicating that the unauthorized person has been detected, or (v) transmitting an instruction that instructs a drone to dispatch and (a) capture images or video of the unauthorized human occupant or (b) follow the vehicle.

In some implementations, the operations may further include in response to determining, by the monitoring system and based on the current occupancy of the vehicle, that the vehicle is occupied by a human occupant, determining, whether the human occupant is an authorized human occupant, and in response to determining, by the monitoring system, that the human occupant is an authorized human occupant, disregarding sensor data and camera data generated by the one or more second monitoring system components configured to monitor the vehicle access point.

In some implementations, the one or more first monitoring system components includes a camera that is installed (i) in a garage or (ii) in the vehicle. In such implementations, obtaining, by the monitoring system, monitoring system data that is generated by one or more first monitoring system components may include obtaining, by the monitoring system, an image that is generated by the camera and determining, by the monitoring system and based on the monitoring system data, a current occupancy of the vehicle may include determining, by the monitoring system and based on the obtained image, the current occupancy of the vehicle.

In some implementations, determining, by the monitoring system and based on the obtained image, the occupancy of the vehicle may include determining, by the monitoring system, whether the obtained image depicts a human object.

In some implementations, the one or more first monitoring system components includes one or more sensors installed in the vehicle. In such implementations, obtaining, by the monitoring system, monitoring system data that is generated by one or more first monitoring system components may include obtaining, by the monitoring system, human occupancy data from the vehicle, wherein the human occupancy data indicates whether there is a human object present in the vehicle and determining, by the monitoring system and based on the monitoring system data, a current occupancy of the vehicle may include determining, by the monitoring system and based on the human occupancy data, whether the vehicle currently includes a human occupant.

In some implementations, using one or more second monitoring system components to monitor the vehicle access point may include obtaining, by the monitoring system, camera data representing one or more images of the vehicle access point and determining, by the monitoring system, whether the camera data depicts one or more objects within a vicinity of the vehicle access point.

In some implementations, the operations may further include in response to determining, by the monitoring system, that the camera data depicts one or more objects within the vicinity of the vehicle access point, triggering the performance of one or more security operations.

In some implementations the one or more security operations include (i) transmitting an alert message to one or more other components of the monitoring system that alerts the one or more other components of the monitoring system of the detection of the one or more objects within the vicinity of the vehicle access point, (ii) transmitting an alert message to a user device that alerts the user of the user device of the detection of the one or more objects within the vicinity of the vehicle access point, (iii) transmitting an instruction that triggers an audible alarm at the property, (iv) transmitting a notification to one or more law enforcement agencies that alerts the one or more law enforcement agencies of the detection of the one or more objects within the vicinity of the vehicle access point, or (v) transmitting an instruction that instructs a drone to dispatch and (a) capture images or video of the one or more detected objects or (b) follow the one or more detected objects.

In some implementations, using one or more second monitoring system components to monitor the vehicle access point may include disregarding sensor data generated by one or more motions sensors installed in a garage at the property, obtaining, by the monitoring system, camera data representing one or more images of the vehicle access point, and determining, by the monitoring system, whether the camera data depicts one or more objects within a vicinity of the vehicle access point.

In some implementations, the operations may further include determining, by the monitoring system, that the one or more objects detected within the vicinity of the vehicle access point includes a human object and in response to determining, by the monitoring system, that the one or more objects detected within the vicinity of the vehicle access point includes a human object, performing facial recognition analysis of the human object.

In some implementations, the one or more second monitoring system components includes a camera. In such implementations, using one or more second monitoring system components to monitor the vehicle access point comprises generating, by the camera, camera data representing one or more images of the vehicle access point, determining, by the camera, that the camera data depicts one or more objects within a vicinity of the vehicle access point, and transmitting, by the camera and to the monitoring system, data indicating that an object has been detected within a vicinity of the vehicle access point.

In some implementations, determining, by the camera, that the camera data depicts one or more objects within a vicinity of the vehicle access point may include obtaining, by the camera, a set of features based on the camera data generated by the camera, determining, by the camera, whether the set of features are within a predetermined similarity level of a stored model representing one or more reference objects, and in response to determining, by the camera, that the set of feature are within a predetermined similarity level of the stored model, transmitting, by the camera and to the monitoring system, data indicating that an object has been detected within a vicinity of the vehicle access point.

According to one innovative aspect of the present disclosure, a system for monitoring a vehicle access point during departure and arrival of an autonomous vehicle is disclosed. In one aspect, the monitoring system for monitoring a property may include one or more processors and one or more computer storage media storing instructions that are operable, when executed by the one or more processors, to cause the one or more processors to perform operations. In some implementations, the operations may include obtaining, by the monitoring system, first monitoring system data that is generated by a first monitoring system component and that reflects activity within a threshold distance of the property, based on the first monitoring system data, determining, by the monitoring system, a current occupancy of a vehicle within the threshold distance of the property, in response to determining that the vehicle within the threshold distance of the property is unoccupied, determining, by the monitoring system, whether to monitor a vehicle access point of the property, based on determining to monitor the vehicle access point of the property, obtaining, by the monitoring system, second monitoring system data that is generated by a second monitoring system component and that reflects activity in a vicinity of the vehicle access point of the property, and based on the second monitoring system data, performing, by the monitoring system, a monitoring system action.

Other aspects include corresponding methods, apparatus, and computer programs to perform actions of methods defined by instructions encoded on computer storage devices.

These and other versions may optionally include one or more of the following features. For instance, in some implementations, the operations may further include in response to determining that the vehicle within the threshold distance of the property is occupied, determining whether the vehicle is occupied by a resident of the property and in response to determining, by the monitoring system, that the vehicle is occupied by a person other than the resident of the property, performing the monitoring system action by performing a security operation.

In some implementations, performing the security operation may include (i) transmitting an alert message to a third monitoring system component that alerts the third monitoring system component of the detection of the person other than the resident of the property, (ii) transmitting an alert message to a user device that alerts the resident of the detection of the person other than the resident of the property, (iii) transmitting an instruction that triggers an audible alarm at the property, (iv) transmitting a notification to one or more law enforcement agencies indicating that the person other than the resident of the property has been detected, or (v) transmitting an instruction that instructs a drone to dispatch and (a) capture images or video of the person other than the resident of the property or (b) follow the vehicle.

In some implementations, the operations may further include in response to determining that the vehicle within the threshold distance is occupied, determining whether the vehicle is occupied by a resident of the property and in response to determining, by the monitoring system, that the vehicle is occupied by a resident of the property, disregarding the second monitoring system data that is generated by the second monitoring system component and that reflects activity in the vicinity of the vehicle access point of the property.

In some implementations, determining, by the monitoring system and based on the obtained image, the current occupancy of the vehicle may include determining, by the monitoring system, whether the obtained image depicts a human.

In some implementations, the first monitoring system component may include a sensor. In such implementations, obtaining, by the monitoring system, first monitoring system data that is generated by a first monitoring system component may include obtaining, by the monitoring system, sensor data generated by the sensor and determining, by the monitoring system and based on the first monitoring system data, a current occupancy of the vehicle may include determining, by the monitoring system and based on the sensor data, the current occupancy of the vehicle.

In some implementations, obtaining second monitoring system data that is generated by the second monitoring system component and that reflects activity in the vicinity of the vehicle access point of the property may include obtaining, by the monitoring system, camera data representing one or more images of the vicinity of the vehicle access point of the property and determining, by the monitoring system, whether the camera data depicts one or more objects within the vicinity of the vehicle access point of the property.

In some implementations, the operations may further include in response to determining, by the monitoring system, that the camera data depicts one or more objects within the vicinity of the vehicle access point of the property, performing the monitoring system action by performing a security operation.

In some implementations, the operations may further include disregarding sensor data generated by one or more motions sensors installed in a garage at the property, obtaining, by the monitoring system, camera data representing one or more images of a garage door, and determining, by the monitoring system, whether the camera data depicts one or more objects within a vicinity of the garage door.

In some implementations, the operations may further include determining, by the monitoring system, that the one or more objects within the vicinity of the garage door includes a human and in response to determining, by the monitoring system, that the one or more objects within the vicinity of the garage door includes a human, performing facial recognition analysis on the one or more images.

In some implementations, the second monitoring system is a camera. In such implementations, the operations may include generating, by the camera, camera data representing one or more images of the vehicle access point of the property, determining, by the camera, that the camera data depicts one or more objects within a vicinity of the vehicle access point of the property, and transmitting, by the camera and to the monitoring system, data indicating that an object has been detected within a vicinity of the vehicle access point of the property.

In some implementations, determining, by the camera, that the camera data depicts one or more objects within a vicinity of the vehicle access point of the property may include obtaining, by the camera, a set of features based on the camera data generated by the camera, determining, by the camera, whether the set of features are within a predetermined similarity level of a stored model representing one or more reference objects, and in response to determining, by the camera, that the set of features are within a predetermined similarity level of the stored model, transmitting, by the camera and to the monitoring system, data indicating that an object has been detected within a vicinity of the vehicle access point of the property.

BRIEF DESCRIPTION OF THE DRAWINGS

FIGS. 2A to 2D are contextual diagrams of a system for gate monitoring during departure of an autonomous vehicle through a gate when a human person is not present inside the autonomous vehicle.

FIG. 4A is a contextual diagram of a system for gate monitoring during arrival of an autonomous vehicle at a gate when a human person is not present inside the autonomous vehicle.

FIG. 4B is a contextual diagram of a system for gate monitoring during arrival of an autonomous vehicle at a gate when a human person is present inside the autonomous vehicle.

DETAILED DESCRIPTION

Figure 1:
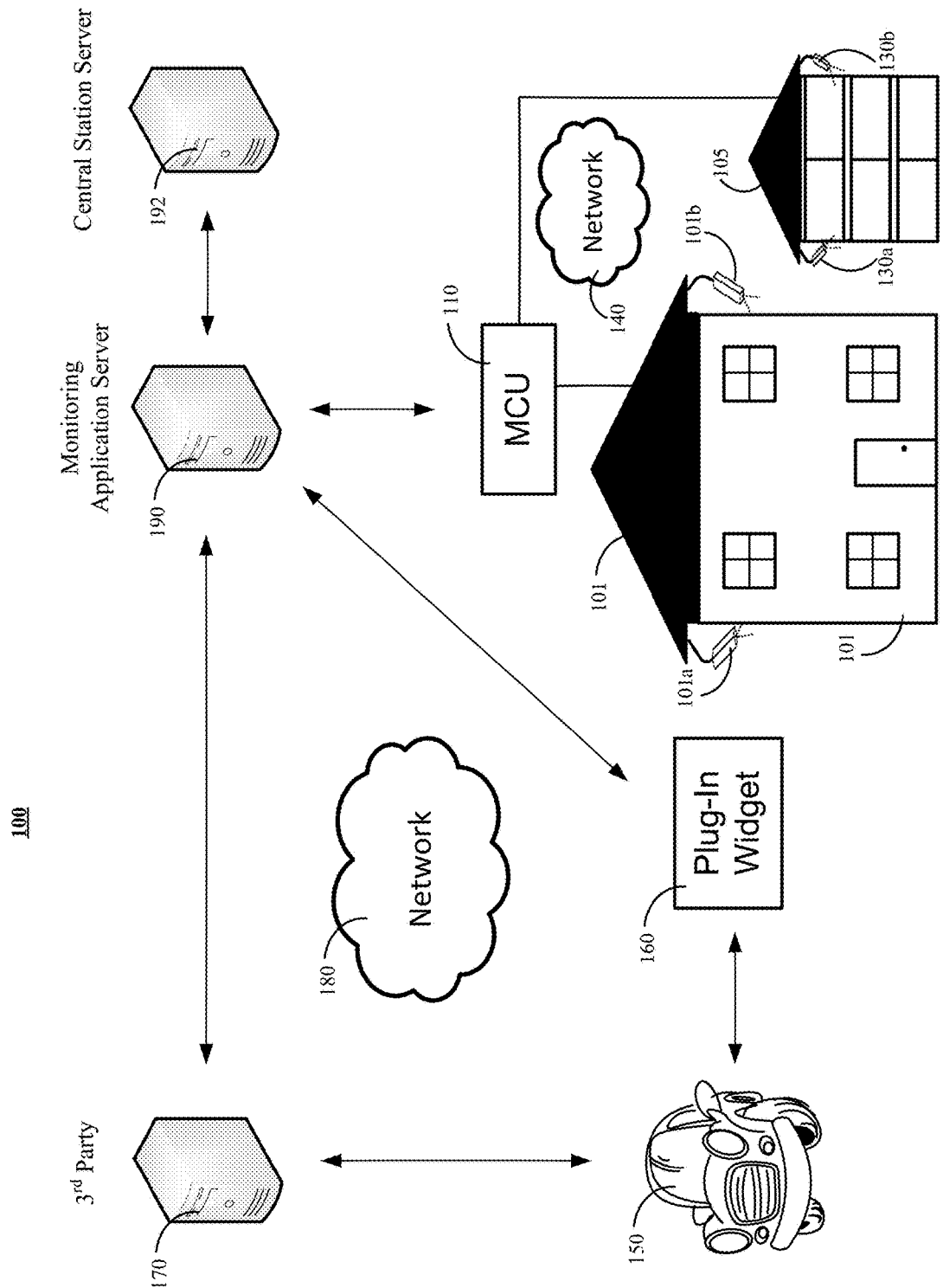
FIG. 1 a block diagram of a system for gate monitoring during departure or arrival of an autonomous vehicle.

Gates such as gates to the entrance to a driveway, an entrance to a commercial parking garage, a garage door of a residential parking garage, or the like can be a point of vulnerability for a monitoring system. Typically, the risk associated with this vulnerability is mitigated by the fact that a human person who is a legitimate occupant of the property associated with the gate is present when the gate is opening to allow a human person to enter or exit through the gate. Because a human person who is a legitimate occupant of the property is present when the gate opens, the human person can have a general awareness of the his/her surroundings and potential security threats such as a trespasser piggy-backing through the open gate. Moreover, a trespasser may be less likely to piggy-back through the gate due to the presence of a human person who is a legitimate occupant of the property being present at the time the gate is open.

The most common occurrence of gate vulnerability occurs when a gate is opened to allow a vehicle such as an automobile to enter or exit a property. In such instances, a human person who is a legitimate occupant of the property has historically been present when the gate is opened or closed because a human person has been required to operate the vehicle. However, we are on the verge of technological breakthroughs that will make fully autonomous vehicles a reality. A fully autonomous vehicle (hereinafter "autonomous vehicle") may include a vehicle such as an automobile that is capable of starting up and navigating from point A to point B within any human interaction other than a received instruction to perform a task. The instructions may include a "go" instruction, a task identifier, a location identifier, an address, a set of addresses, or a combination thereof. Because of these technological breakthroughs, a human person will no longer be required to operate the vehicle. In fact, there will no longer be a requirement for a human person to be present in the autonomous vehicle when the vehicle departs from the property, returns to the property, or both. In these scenarios, a window of opportunity arises for a trespasser to piggy-back into the property during the time period that the gate is opened to allow an autonomous vehicle to enter or exit the property. For purposes of this disclosure, "piggy-backing" into a property may include a person sneaking into the property via the gate opening during the period of time that the gate was legitimately opened for an autonomous vehicle.

The disclosed system and method can also be used to mitigate other security risk that can arise in the age of autonomous vehicles. For example, the system and method disclosed herein that can be used to detect unauthorized "hitchhiking" using an autonomous vehicle. "Hitch hiking" may include a person who is not a resident (or other legitimate occupant of the property) gaining access to the inside of the autonomous vehicle and trying to sneak into a property by riding inside the autonomous vehicle through gate.

The system and method disclosed herein mitigate security risks associated with an autonomous vehicle by (i) disaggregating sensor data generated and broadcast during an autonomous vehicle's entrance or exit through a gate and (ii) analyzing video of the gate opening, images of the gate opening, or a combination thereof. The system and method for mitigating security risks associated with an autonomous vehicle is described in more detailed below. In some implementations, an application programming interface (API) is used to facilitate communication between an autonomous vehicle and a monitoring unit (e.g., monitoring system control unit 110, monitoring application server 190, or the like).

FIG. 1 a block diagram of a system 100 for gate monitoring during departure or arrival of an autonomous vehicle. The system 100 may include one or more of a property 101, one or more cameras 101a, 101b, garage 105, a monitoring system control unit 110, one or more cameras 130a, 130b, a local network 140, an autonomous vehicle 150, a plug-in widget 160, a third-party server 170, a remote network 180, a monitoring application server 190, a central station server 192, or a combination thereof.

The autonomous vehicle 150 is capable of autonomously navigating to a destination without the aid of a human person to operate the vehicle while navigating. For example, a human person may input one or more instructions such as a destination address, and instruct the autonomous vehicle to travel to the destination address. However, the human person would not drive the car to the destination address. Instead, the autonomous vehicle 150 performs actions of driving and navigation. In some instances, the autonomous vehicle 150 may be configured to a manual mode. In such instances, though fully capable of driving and navigating without human interaction, the autonomous vehicle 150 may be driven, in manual mode, by a human user.

The autonomous vehicle 150 can include a network interface that enables the autonomous vehicle 150 to communicate with at least a third-party server 170 hosting one or more third party cloud-based services. For example, the third-party server 170 may be configured to obtain communications transmitted by the autonomous vehicle 150 and relay the obtain communication via the remote network 180 to a monitoring application server 190 of a monitoring system provider. The monitoring application server 190 may host one or more cloud-based services that can be used to monitor operations at a property such as property 101, the garage 105 or property 101, or one or more other properties that are subscribed to the monitoring services provided by the monitoring system provider. The monitoring application server 190 may include an application programming interface (API) that allows the monitoring application server 190 to interface with the third-party server 170. Alternatively, or in addition, the API can be included in the monitoring system control unit 110.

The remote network 180 may include a LAN, a WAN, a cellular network, the Internet, or the like. In some implementations, the remote network 180 may a wireless network such as a Wi-Fi network, a cellular network, or the like. Alternatively, one or more portions of the remote network 180 may also be implemented using wired network such as an Ethernet network, a cable network, a fiber optic network, or the like.

The API includes one or more software modules that can enable the monitoring application server 190 to interface with the third-party server 170. For example, the API enables the monitoring application server 190 to receive communications from the autonomous vehicle 150 that have been obtained by the third-party server 170 and relayed to the monitoring application server 190. For example, the autonomous vehicle 150 may broadcast data indicative of the human occupancy of the autonomous vehicle 150. By way of example, the autonomous vehicle 150 may include one or more occupancy sensors that generate sensor data indicative of whether one or more human persons are occupying the vehicle. The occupancy sensors may include, for example, one or more pressure sensors in each respective seat of the autonomous vehicle 150 detect whether a human person is sitting in a seat of the autonomous vehicle 150, one or more thermal sensors to detect heat from human persons inside the autonomous vehicle 150, one or more cameras to capture video, images, or both, that can be analyzed for the presence of human persons inside the autonomous vehicle 150, or a combination thereof.

Alternatively, or in addition, the autonomous vehicle 150 may broadcast data indicative of the particular task that the autonomous vehicle 150 is currently engaged in. For example, the autonomous vehicle 150 may broadcast data indicative of whether the autonomous vehicle 150 is in manual drive mode (e.g., being driven by a human person) or autonomous drive mode (e.g., being driven autonomously by the vehicle without human interaction). In some implementations, the data indicative of a particular task broadcast by the autonomous vehicle 150 may include, for example, a task-type such as pick-up kids from school, get oil change, pick-up groceries, giving driver-less taxi rides, dropping-off autonomous vehicle owner at work, picking-up autonomous vehicle owner from work, or the like.

In some implementations, the autonomous vehicle 150 may be able to communicate with the monitoring application server 190 directly, without using the third-party server 170. For example, the autonomous vehicle 150 may have one or more plug-in widgets 160 installed. The one or more plug-in widgets 160 may include one or more software modules that enable the autonomous vehicle 150 to directly communicate with the monitoring application server 190 via the remote network 180. In such implementations, the API installed on the monitoring application server 190 can be configured to interface with the plug-in widget 160. The plug-in widget may be configured to broadcast data across the remote network 180 such as data that is indicative of human occupancy of the autonomous vehicle 150, data that is indicative of the current task of the autonomous vehicle 150, or the like.

The API that enables the cloud-based monitoring servers to interface with, and receive communications from, the autonomous vehicle 150 is described as being installed on the monitoring application server 190. However, the present disclosure need not be so limited. For example, the API may alternatively (or additionally) be installed on the monitoring system control unit 110. In such implementations, the monitoring system control unit 110 can be enabled to interface with, and receive communications from, the autonomous vehicle 150 in the same manner as the monitoring application server 190 described herein. In general, any functionality described with reference to the monitoring application server 190 in this specification may also be performed by the monitoring system control unit 110, and vice versa.

The monitoring application server 190 include one or more cloud services that can provide data that broadcasted by the autonomous vehicle 150 and obtained by the API from either the third party server 150, plug-in widget 160, or both, to the monitoring system control unit (MCU) 110. The monitoring system control unit 110 can monitor (i) sensor data broadcast by one or more sensors (e.g., motion sensors, contact sensors, glass-break sensors, temperatures sensors, energy sensors, carbon monoxide sensors, smoke sensors, or the like), (ii) camera data captured by one or more cameras 101a, 101b, 130a, 130b (e.g., video data, image data, or both), and determine, based on the detected sensors data, detected camera data, or both, whether a potential event is occurring at the property 101, the garage 105, or the like.

Potential events may include, for example, alarm events (e.g., trespassing, break-ins, or the like), emergency events (e.g., fires, floods, carbon monoxide, smoke, etc.), family events (e.g., calendar events), or the like. For example, the monitoring system control unit 110 may detect a potential alarm event such as a break-in by a burglar may be occurring if sensor data from one or more motion sensors when the monitoring system control unit 110 is in an "armed" state. An armed state may include a state of the monitoring system that indicates that the monitoring system control unit 110 may generate data indicative of a potential event if sensor data from one or more motion sensors depicts movement, one or more contact sensors detect an opening of a door or window, one or more glass-break sensors detect the breaking of glass, or a combination thereof. The event notification may be transmitted to the monitoring application server 190 for further processing, further analysis, or both. Then, the monitoring application server 190 can determine, based on the received event notification, whether to notify a central alarm station server 192 that a potential event is occurring at the property 101, the garage 105, or both. In response to receiving the notification from the monitoring application server 190, the central alarm station server 192 can dispatch local authorities to the property to investigate. Alternatively, or in addition, in some implementations, the monitoring system control unit 110 can transmit the event notification data directly to the central alarm station server 192 in order to trigger dispatching of local authorities.

In some implementations, the central monitoring station server 192 may immediately dispatch local authorities without further review of a notification from the monitoring application server 190, monitoring system control unit 110, or both. Alternatively, in other implementations, the central monitoring station server 192 may perform additional analysis to determine whether to dispatch local authorities based on the notification received from the monitoring application server 190, monitoring system control unit 110, or both.

The monitoring system control unit 110 is also configured to monitor gate openings such as a garage door of the garage 105 that occur when an autonomous vehicle such as autonomous vehicle 150 enters or exits the garage 105. The "gate opening" may include an opening (e.g., an aperture or gap allowing access) between an indoor portion of a garage and an outdoor portion of a garage that is (i) exposed when a garage door is opened so that a vehicle can enter/exit or (ii) exposed when a garage door is closed after a vehicle has entered/exited. However, the "gate opening" is not limited to an entrance or exit from a garage. Instead, the "opening" of a "gate" may include any vehicle access point that can be selectively restricted by a physical or non-physical barrier in a manner that permits vehicle passage when the barrier is removed and prohibits vehicle access when the barrier is put back in place.

Monitoring gate openings may include, for example, disaggregating sensor data from one or more sensors installed in the garage 105, disaggregating camera data captured by one or more cameras 130a, 130b, or both. In some implementations, the sensor data, camera data, or both, may be disaggregate based on human occupancy of the autonomous vehicle 150, a current task of the autonomous vehicle 150, or a combination thereof. Disaggregating the sensor data, camera data, or both, may include determining when to (i) analyze the sensor data, camera data, or both, to determine whether a potential event is occurring and (ii) whether to disregard sensor data, camera data, or both.

In some instances, the monitoring system control unit 110 may disregard sensor data, camera data, or both, generated by each of the sensors in (or around) the garage 105, each of the cameras 130a, 130b in (or around) the garage 105, or both, based on (i) human occupancy of the autonomous vehicle 150, (ii) the current task type of the autonomous vehicle 150, or both. In other instances, the monitoring system control unit 110 may disregard only a subset of sensor data, camera data, or both, from one or more sensors in (or around) the garage 105, one or more cameras 130a, 130b in (or around) the garage, or both based on (i) human occupancy of the autonomous vehicle 150, (ii) the current task type of the autonomous vehicle 150, or both. In yet other instances, the monitoring system control unit 110 may rely on sensor data, camera data, or both, generated by each of the one or more sensors in the garage 105, each of the one or more cameras 130a, 130b in the garage, or both, based (i) human occupancy of the autonomous vehicle 150, (ii) the current task type of the autonomous vehicle 150, or a combination thereof.

By way of example, the monitoring system control unit 110 may disregard sensor data from each of the one or more sensors in the garage 105, camera data from each of the one or more cameras 130a, 130b (in or around) the garage, or both, based on a determination that there is an authorized human occupant in the autonomous vehicle 150 as the autonomous vehicle approaches within a predetermined distance of a gate (e.g., a garage door). An authorized human occupant may include a resident (or other legitimate occupant) of the property. The monitoring system control unit 110 (or monitoring application server 190) Alternatively, the monitoring system control unit 110 may only disregard sensor data from a subset of the sensors in the garage 105 (e.g., motion sensors, contact sensors, or both) based on determining that an autonomous vehicle 150 does not include any human occupants and analyze video, images, or both from one or more cameras 130a, 130b in (or around) the garage for indications of human activity. If human activity is detected based sensor data from one or more sensors whose sensor data is still being monitoring (e.g., glass break sensors) or camera data, then the monitoring system control unit 110 may generate event data indicative of a potential event. The monitoring system control unit 110 may determine human occupancy of a vehicle using sensor data generated from one or more sensors in the garage 105, camera data generated by one or more cameras 130a, 130b in (or around) the garage 105, or vehicle data from autonomous vehicle 150 (e.g., human occupancy data, current task type data, or the like).

In some implementations, the monitoring system control unit 110 may be a computing device such as wall-mounted control panel that is installed at the property 101. In other implementations, the monitoring system control unit 110 may be a computing device such as a laptop computer, desktop computer, server computer, or the like that resides at the property 101. In yet other implementations, the property 101 may not have any physical computing device installed at the property 101 to perform the operations described (above or below) as being performed by the monitoring system control unit 110. Instead, in such implementations where there is not any physical computing device installed at the property 101 to perform the operations described (above or below) as being performed by the monitoring system control unit 110, each of the functions described as being performed by the monitoring system control unit 110 may be performed by one or more computers that is remote from the property 101 such as the monitoring application server 190 which can be configured cloud-based monitoring unit to perform all of the functions of the monitoring system control unit 110 at a location that is remote from the property 101.

FIGS. 2A to 2D are contextual diagrams of a system for gate monitoring during departure of an autonomous vehicle 150 through a gate when a human person is not present inside the autonomous vehicle 150.

The system shown in FIGS. 2A-2D is the same system as system 100 described with reference to FIG. 1. However, only a portion of the system 100 is depicted in FIGS. 2A-2D to describe specific functionality of the system 100.

FIG. 2A is an example of a garage 105 whose gate 106 (e.g., garage door) is monitored by a monitoring system control unit 110 (or monitoring application server 190) during an autonomous vehicle's 150 exit from the garage 105. In FIG. 2A, the gate 106 is closed. With the gate 106 closed, one or more cameras 130a, 130b may be visible from the exterior of the garage 105. The one or more cameras 130a, 130b may be configured to capture video, images, or both, of the entrance to the garage 105 when the gate 106 is open. Though the cameras 130a, 130b are depicted as outside the garage 130, the present disclosure need not be so limited. For example, the cameras 130a, 130b may also be installed inside the garage 105 and configured in a manner that allows the cameras 130a, 130b to capture video, images, or both of the entrance to the garage 105 as the gate 106 opens. The monitoring system control unit 110 is conceptually depicted in association with the garage 105. However, there is no requirement that the monitoring system control unit 110 be installed in the garage 105. Instead, the monitoring system control unit 110 can be installed in the garage 105, in the property 101, or a combination thereof. Alternatively, the one or more of the operations described herein as being performed by the monitoring system control unit 110 may be performed by a cloud-based monitoring unit such as the monitoring application server 190.

The monitoring system control unit 110 may communicate with the one or more sensors in the garage 105, one or more cameras in (or around) the garage 105, or both, using a local network 140. The local network 140 may be comprised of wired networks, wireless networks, or a combination thereof. The local network 140 may include a LAN, a WAN, a cellular network, a ZigBee network, a z-wave network, the Internet, a combination thereof, or the like. The local network 140 may be wireless, wired, or a combination of both.

In some implementations, the monitoring application server 190 may communicate with the one or more sensors in the garage 105, one or more cameras in (or around) the garage 105, the monitoring system control unit 110, or a combination thereof, using the local network 140, a remote network 180 (shown in FIG. 1), or both. The remote network 180 (shown in FIG. 1) may include, for example, a LAN, a WAN, a cellular network, the Internet, or the like. In some implementations, the remote network 180 may a wireless network such as a Wi-Fi network, a cellular network, or the like. Alternatively, one or more portions of the remote network 180 may also be implemented using wired network such as an Ethernet network, a cable network, a fiber optic network, or the like.

FIG. 2B is example of the same garage 105 as depicted in FIG. 2A. However, in the example of FIG. 2B, the gate 106 of the garage 105 is made transparent so that the inside of the garage 105 can be seen. The transparent gate 106 reveals one or more sensors 120a, 120b, 120c, 120d, one or more cameras 130c, 130d, and an autonomous vehicle 150 that are inside the garage 105.

The one or more cameras such as cameras 130c, 130d can be used to capture video, images, or both, of the inside of the garage 105. The video, images, or both, may include video or images of the area surrounding the autonomous vehicle 150, video or images of the inside of the autonomous vehicle 150 (e.g., driver's seat, passenger's seat, back seat, or the like), or both. In some implementations, the one or more cameras 130c, 130d may need to be strategically at an appropriate height on the garage wall so that the one or more cameras 130c, 130d have a line-of-sight that is able to view inside portions of the autonomous vehicle 150 such as the driver's seat, passenger's seat, back seat, or the like. In some implementations, one or more thermal cameras may be employed in order to determine whether there is one or more objects in the autonomous vehicle having a heat signature that corresponds to the heat signature for a human person.

In some implementations, the cameras 130c, 130d may transmit captured video, images, or both, to a monitoring system control unit 110, monitoring application server 190, or other monitoring system component for analysis to determine whether the captured video, images, or both, include one or more objects such as a human object. In other implementations, the cameras 130c, 130d may store image models comprising one or more images, one or more sets of features representing an image of an object, a trained machine learning model, or some combination thereof, that may be used, by the camera, to determine whether a captured image, video, or both, depicts an object such as a human object. For example, the cameras 130c, 130d may obtain an image or video, extract a set of features from the obtained image or video, and then determine whether the extracted set of features match a set of stored features of an image model within a predetermined level of similarity. In such instances, the camera such as a camera 130c, 130d may transmit data representing a determination by the camera that captured image or video depicts an object such as a human object without requiring the camera 130c, 130d to transmit the image or video to the monitoring system control unit 110, the monitoring application server 190, or other monitoring system component. Such implementations can conserve network bandwidth by not transmitting all captured images, videos, or both, from the camera to other monitoring system components. However, in some implementations, the cameras 130c, 130d may be configured to store images or video locally (or remotely) for at least a predetermined amount of time. In such implementations, a user of a terminal connected to one or more monitoring system components such as the monitoring application server 190 may request a captured image or video from the camera 130c, 130d. Such implementations can significantly converse network resources such as bandwidth.

Sensor data generated by the one or more sensors such as sensors 120a, 120b, 120c, 120d can be analyzed by the monitoring system control unit 110 (or monitoring application server 190) monitor the garage 105. The sensors may include a motion sensors 120a, a contact sensor 120b, a glass break sensors 120c, and a temperature sensors 120d. Other types of sensors may also be installed in the garage 105.

In some implementations, the monitoring system control unit 110 (or monitoring application server 190) can also detect human occupancy data broadcast from the autonomous vehicle 150 via the network 140. Human occupancy data may include, for example, data from the autonomous vehicle 150 that is indicative of whether the autonomous vehicle 150 has one or more human occupants. The human occupancy data that is broadcast by the autonomous vehicle 150 can be include, or otherwise be based on, data generated by one or more pressure sensors in the respective seats of the autonomous vehicle 150, one or more thermal sensors in the autonomous vehicle 150, one or more cameras (e.g., HD cameras, SD cameras, night vision cameras, thermal cameras, or the like) in the autonomous vehicle 150, or the like. Alternatively, or in addition, the human occupancy data may be based on current task data broadcast by the autonomous vehicle 150.

The monitoring system control unit 110 (or monitoring application server 190) may disaggregate (i) sensor data obtained from the one or more sensors 120a, 120b, 120c, 120c and (ii) camera data from the one or more cameras 130a, 130b, 130c, 130d based on the human occupancy of the autonomous vehicle 150. The monitoring system control unit 110 (or monitoring application server 190) may determine the human occupancy of the autonomous vehicle 150 based on (i) sensor generated by the one or more sensors 120a, 120b, 120c, 120d, (ii) camera data from one or more cameras 130a, 130b, 130c, 130d, (ii) human occupancy data from the autonomous vehicle 150, or a combination thereof. In some implementations, each type of the aforementioned types of data may not be available to the monitoring system control unit 110 (or monitoring application server 190). For example, the garage 105 may not have one or more sensors installed, the garage 105 may not have a camera with a view of each respective seat of the autonomous vehicle 150 (e.g., because of the way the autonomous vehicle was last parked in the garage 105), or the autonomous vehicle 150 (e.g., may not include human occupancy sensors because the owner may not have selected that package when he/she purchased the autonomous vehicle 150). In such instances, the monitoring system control unit 110 (or monitoring application server 190) can make a human occupancy determination based on the subset of data available to the monitoring system control unit 110 at the particular time. For example, the monitoring system control unit 110 (or monitoring application server 190) may determine human occupancy of the autonomous vehicle based on sensor data (e.g., because motion was detected by a motion sensors 120a immediately before the autonomous vehicle broadcasted data indicating that it had started its engine) and a determination that camera data did not depict any human occupants in the autonomous vehicle.

With reference to the example of FIG. 2B, for example, the monitoring system control unit 110 (or monitoring application server 190) may determine that autonomous vehicle 150 does not have any human occupants and that the autonomous vehicle 150 has broadcasted a request to open the gate 106 so that the autonomous vehicle can leave to perform an errand (e.g., generate income for car owner by performing driver-less taxi rides). In response to the request to open the gate 106, the monitoring system control unit 110 (or monitoring application server 190) may begin to disregard sensor data from a subset of the sensors 120a, 120b, 120c, 120d in the garage so that the autonomous vehicle 150 can leave the garage 105, begin capturing and analyzing (in real-time or near real-time) camera data captured by the one or more cameras 130a, 130b with a line of sight of the gate 106 opening, and begin to open the garage door as shown in FIG. 2C. The motion sensors 120a and the contact sensor 120b are depicted with an message and arrow in a circle with a line through it because, though the sensors 120a, 120b may be generating and broadcasting sensor data indicating, for example, that there is movement in the garage 105 and the contact sensor between the gate 106 and a surface of the garage 105 has been severed, the monitoring system control unit 110 (or monitoring application server 190) will disregard the sensor data from sensors 120a, 120b so that the autonomous vehicle 150 can enter into the garage 105 without triggering an alarm event.

With reference to FIG. 2D, the gate 106 may be sufficiently open for the autonomous vehicle 150 to exit the garage 105. At this time, the motion sensor 120a may be disabled to allow the autonomous vehicle 150 to leave the garage 105 without triggering a false alarm. This scenario would create an opportunity for the trespasser 103 to enter into the opening created by the opened gate 106 and allow the trespasser to 103 to enter the garage 105.

However, one or more of the cameras such as camera 130a may capture camera data 132 such as video, image, or both that is streamed to the monitoring system control unit 110 (or monitoring application server 190) for analysis. The monitoring system control unit 110 (or monitoring application server 190) can perform video (or image) analytics on the streamed camera data 132 to determine whether the camera data 132 depicts the presence of an object (e.g., a human person such as trespasser 103, an animal, or the like) in the camera data 132. With reference to the example of FIG. 2D, the monitoring system control unit (or monitoring application server 190) can determine that the camera data 132 depicts a human person (e.g., trespasser 103).

In some implementations, the monitoring system control unit 110 (or monitoring application server 190) may broadcast data indicative of a potential alarm event based on the detection of a human person entering into the garage 105. Alternatively, or in addition, the monitoring system control unit 110 (or monitoring application server 190) may perform facial recognition analysis of one or more video, images, or both, in the camera data 132 showing the face of a human person (e.g., a trespasser 103) and determine that the human person is not a legitimate occupant of the property 101. The monitoring system control unit (or monitoring application server 190) may generate data indicative of a potential alarm event at the property 101 based on detection of the trespasser 103 attempting to sneak into the garage 105. A notification 134 may be transmitted to the monitoring application server 190, the central alarm station server 192, or both, based on the generated data that is indicative of an event, the detected trespasser, or both. The central alarm station server 192 may alert local authorities and request that local authorities deploy to the garage 105 of property 101.

The monitoring system control unit 110 (or monitoring application server 190) may perform other operations in response to detecting the trespasser 103. For example, the monitoring system control unit 110 (or monitoring application server 190) trigger an extremely loud audible alarm at the garage 105, the property 101, or both, in an effort to disable or disrupt the trespasser 103. Alternatively, or in addition, the monitoring system control unit 110 (or monitoring application server 190) may trigger lights (e.g., connected lights, extremely bright & connected strobe lights, etc.) to flash on and off, repeatedly, at the property to disorient the trespasser. The monitoring system control unit 110 (or monitoring application server 190) may instruct a flying drone (e.g., a quad-copter) to deploy and confront the trespasser 103 by outputting extremely loud music, flashing extremely bright lights, swarming the trespasser 103, or the like in an effort to chase the trespasser 103 away from the garage 105 or property 101. The flying drone may lock-on to the trespasser 103, follow the trespasser 103, and report the trespasser's 103 location to local authorities that can find the trespasser 103 and apprehend the trespasser 103 using location data from the flying drone. The flying drone can be stationed on a charging pad inside the garage 105 or on a charging pad outside the garage 105.

Alternatively, or in addition, in response to the detection of a potential alarm event (e.g., detection of a trespasser 103, detection of a potential burglar, detection of a broken window, detection of motion in the house when security system is in an armed-away state, detection of triggered contact sensor, or the like), the autonomous vehicle 150 can be used as an extension of the monitoring system controlled by the monitoring system control unit 110 (or monitoring application server 190). For example, after detecting a potential alarm event, the monitoring system control unit 110 (or monitoring application server 190) may communicate with the autonomous vehicle 150 to determine the location of the autonomous vehicle 150. If the monitoring system control unit 110 (or monitoring application server 190) determines that the autonomous vehicle 150 is located at the property 101 (or within a predetermined distances of the property 101), then the monitoring system control unit 110 (or monitoring application server 190) can trigger the autonomous vehicle's 150 car alarm and lights to off. This can result loud sounds and blinking lights that can attract attention to the property, scare the trespasser or burglar away, both, using highly audible and visible signals that can rouse neighbors and be detectable throughout the community. If the autonomous vehicle 150 is not within a predetermined distance of the property 101, then the monitoring system control unit 110, the monitoring application server 190, or both, may instruct the autonomous vehicle 150 to return to the property 101 and perform one or operations (e.g., sounding a car alarm, flashing lights, one or more of the operations described below, or the like).

Alternatively, or in addition, to the triggering of the car alarm and lights, the monitoring system control unit 110 (or monitoring application server 190) can instruct the autonomous vehicle to activate Light Detection and Ranging (LIDAR) sensors, Radio Detection and Ranging (RADAR) sensors, Sound Navigation and Ranging (SONAR) sensors, or the like of the autonomous vehicle 150 that can scan for the presence of objects such as human intruders on the property 101. The autonomous vehicle 150 can use LIDAR, RADAR, SONAR, or a combination thereof to determine the number of fleeing individuals on the property 101. The autonomous vehicle 150 can use the LIDAR, RADAR, or SONAR sensors to track individuals fleeing form the garage 105, the property 101, or both, and record the direction that the individuals flee. Law enforcement, or some other individual, may later access the recorded information and determine the number of trespassers, the direction in which the trespassers fled, or a combination thereof. In some implementations, the monitoring system control unit 110 (or monitoring application server 190) may activate one or more cameras of the autonomous vehicle to capture video of the trespassers. The video may recorded on a local storage device of the autonomous vehicle 150, or streamed to a remote location such as to the monitoring system control unit 110, the monitoring application server 190, a user's computer, a user's mobile device, a cloud storage device, or the like.

Alternatively, or in addition, the autonomous vehicle 150 may broadcast tracking data determined based on the use of LIDAR, RADAR, SONAR, or the like to track one or more fleeing trespassers. Alternatively, or in addition, the monitoring system control unit 110 (or monitoring application server 190) may determine, based on analysis of video, images, or both that can be detected by the monitoring system control unit 110 (or the monitoring application server 190). Then, based on either the broadcasted tracking data or the video/image analysis, the monitoring system control unit 110 (or monitoring application server 190) may determine that the one or more trespassers are fleeing. In response, the monitoring system control unit 110 (or monitoring application server 190) may instruct the autonomous vehicle 150 to following the fleeing trespassers. The autonomous vehicle 150 may continue to follow the fleeing trespassers and transmit the location of the fleeing trespassers to the monitoring system control unit 110, the monitoring application server 190, the central alarm station server 192, or a combination thereof.

The autonomous vehicle 150 may be integrated into the monitoring system in other ways. For example, since the autonomous vehicle 150 can be parked inside the garage 105, the monitoring system control unit 110 (or monitoring application server 190) can monitor sensor data generated by the one or more sensors that are inside the garage to make sure the environment inside the garage is safe for human persons to enter. For example, the monitoring system control unit 110 (or monitoring application server 190) can monitor sensor data generated by one or more carbon monoxide sensors inside the garage.

In some implementations, for example, an autonomous vehicle 150 may be in the garage and have its ignition turn on. This can result in exhaust gases from the car being output into the enclosed space of the garage 105. The monitoring system control unit 110 (or monitoring application server 190) can detect the output of deadly gases such as carbon monoxide based on sensor data generated by one or more carbon monoxide sensors, determine whether the autonomous vehicle 150 is inside the garage 105, determine the stage of the gate 106 (e.g., garage door), and perform one or more operations. For example, in response to detecting carbon monoxide in the garage 105, the monitoring system control unit 110 (or monitoring application server 190) can transmit an instruction to the autonomous vehicle 150 to instruct the autonomous vehicle to shut off its ignitions.

In some implementations, based on (i) the arming state of the monitoring system (e.g., armed-home, armed-away, not-armed), (ii) perceived occupancy in the garage, or both, the monitoring system control unit 110 (or monitoring application server 190) may transmit an instruction to a gate 106 opening device to open the gate 106. This can allow the garage to air-out, and restore the environment inside the garage 105 to an environment that is safe for a human person to breathe. In addition, the monitoring system control unit 110 (or monitoring application server 190) can instruct the autonomous vehicle to move through the open gate 106 and out of the garage 105, in order to allow the garage 105 to air out.

The monitoring system control unit 110 (or monitoring application server 190) can prioritize the factors that are considered when determining whether to instruct the gate 106 to open. For example, the monitoring system control unit 110 (or monitoring application server 190) can assign a higher weight to the perceived occupancy of a human person in the garage than a weight that is assigned to the arming state of the monitoring system. In such instances, for example, even if the monitoring system is in one or more "armed" states, the monitoring system control unit 110 (or monitoring application server 190) may instruct the gate 106 to open in an effort to have the garage 105 air-out.

Though using a vehicle as a device that is monitored by the monitoring system control unit 110 (or monitoring application server 190), an extension of the monitoring system, or both, is described as an autonomous vehicle 150, the present disclosure need not be so limited. For example, any connected vehicle can be used as an extension of the monitoring system in the manner described above without necessarily being "autonomous."

FIGS. 3A to 3D are contextual diagrams of a system for gate 106 monitoring during departure of an autonomous vehicle 150 through a gate when a human person is present inside the autonomous vehicle 150.

The system shown in FIGS. 3A-3D is the same system as system described with reference to FIG. 1. However, only a portion of the system 100 is depicted in FIGS. 3A-3D to describe specific functionality of the system 100.

Figure 3A:
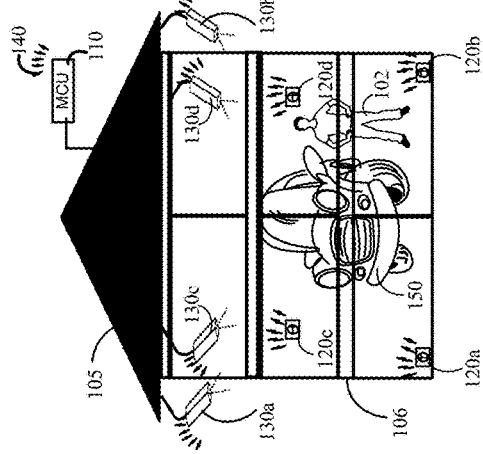
FIGS. 3A to 3D are contextual diagrams of a system for gate monitoring during departure of an autonomous vehicle through a gate when a human person is present inside the autonomous vehicle.

FIG. 3A is an example of a garage 105 whose gate 106 (e.g., garage door) is monitored by a monitoring system control unit 110 (or monitoring application server 190) during an autonomous vehicle's 150 exit from the garage 105. The garage 105 shown in FIG. 3A is the same garage as shown in FIG. 2A. However, FIGS. 3B to 3D describe the operation of the system 100 in a different context than the system 100 in FIGS. 2B to 2D.

Figure 3B:
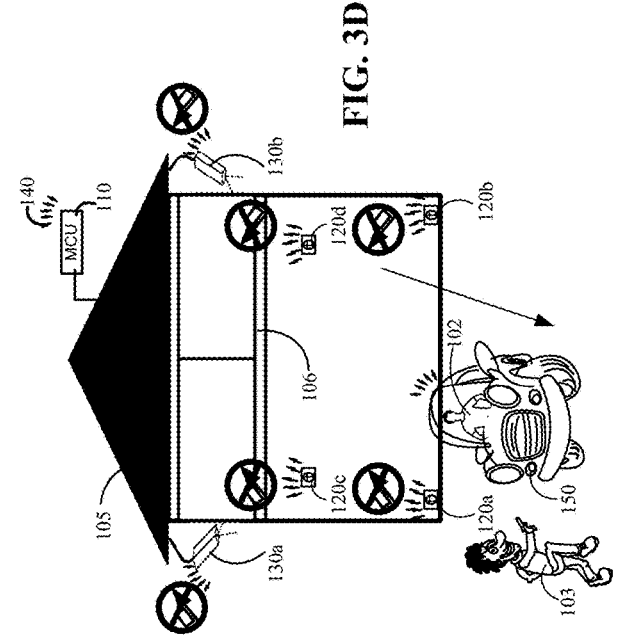

FIG. 3B is example of the same garage 105 as depicted in FIGS. 2A, 3A. However, in the example of FIG. 3B, the gate 106 of the garage 105 is made transparent so that the inside of the garage 105 can be seen. The transparent gate 106 reveals one or more sensors 120*a*, 120*b*, 120*c*, 120*d*, one or more cameras 130*c*, 130*d*, and an autonomous vehicle 150 that are inside the garage 105. In addition, the transparent gate 106 reveals that a human person 102 is standing within the garage 105 and ready to get into the autonomous vehicle 150.

By way of example, with reference to FIG. 3B, the monitoring system control unit 110 (or monitoring application server 190) can determine that a human person 102 is moving within the vicinity of the autonomous vehicle 150 based on sensor data generated by a motion sensors 120*a*, based on analysis of camera data generated by one or more cameras 130*a*, 130*b*, 130*c*, 130*d*, or the like. The human person 102 may enter the autonomous vehicle 150, and the engine of the autonomous vehicle 150 may be started by the human person 102 or the autonomous vehicle. The autonomous vehicle 150 may broadcast data indicating that the autonomous vehicle's 150 engine has been started. The monitoring system control unit 110 (or monitoring application server 190) may determine, based on detecting the data broadcast by the autonomous vehicle 150 that the autonomous vehicle has a human occupant. In the example of FIG. 3B, the autonomous vehicle 150 may, for example, drive the human person 102 to work.

Alternatively, or in addition, the autonomous vehicle 150 may detect that a human person has entered the autonomous vehicle 150 and generate and broadcast human occupancy data indicating that one or more human persons are present in the autonomous vehicle 150. For example, the autonomous vehicle 150 may determine that the door of the autonomous vehicle 150 has been opened and that the pressure sensors in one or more seats are generating sensor data indicating that a human person is present in the autonomous vehicle 150. Alternatively, or in addition, the autonomous vehicle 150 may determine, based on camera data from one or more cameras inside the autonomous vehicle 150 that the human person is present in the autonomous vehicle 150. Alternatively, or in addition, the autonomous vehicle 150 may determine that a human occupant is in the car based on a driving instruction received by the autonomous vehicle 150. For example, the autonomous vehicle 150 may determine, based on an instruction such as a voice input instruction such as "drive me to work," that a human occupant is in the vehicle. In each of the aforementioned instances, the autonomous vehicle 150 may determine that a human person is an occupant of the autonomous vehicle 150, and broadcast human occupancy data indicating that the autonomous vehicle 150 has a human occupant via the network 140.

The monitoring system control unit 110 (or monitoring application server 190) may determine, based on sensor data from a motion sensors 120*a*, camera data from one or more cameras 130*a*, 130*b*, 130*c*, 130*d*, human occupancy data broadcasted by the autonomous vehicle 150, that the autonomous vehicle 150 has a human occupant such as human person 102. The monitoring system control unit 110 (or monitoring application server 190) may disaggregate sensor data, camera data, or both, based on the determination that the autonomous vehicle 150 includes a human occupant.

Figure 3C:
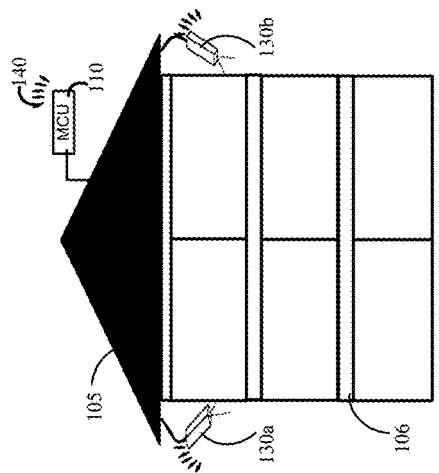

With reference to the example of FIG. 3B, for example, the monitoring system control unit 110 (or monitoring application server 190) may determine that autonomous vehicle 150 has a human occupant and that the autonomous vehicle 150 has broadcasted a request to open the gate 106 so that the autonomous vehicle can leave on trip such as driving the human occupant to work. In response to the request to open the gate 106, the monitoring system control unit 110 (or monitoring application server 190) may begin to disregard sensor data from each of the sensors 120*a*, 120*b*, 120*c*, 120*d* in the garage so that the autonomous vehicle 150 can leave the garage 105 and disregard camera data captured by the one or more cameras 130*a*, 130*b*, 130*c*, 130*d*. The monitoring system control unit 110 (or monitoring application server 190) disregards sensor data from each of the sensors 120*a*, 120*b*, 120*c*, 120*d* and disregards camera data from each of the one or more cameras 130*a*, 130*b*, 130*c*, 130*d* because a human occupant 102 is present in the autonomous vehicle 150. In FIG. 3C, the motion sensor 120*a*, the contact sensor 120*b*, and the cameras 130*a*, 130*b* are depicted with a message and arrow in a circle with a line through it because the monitoring system control unit 110 (or monitoring application server 190) will disregard sensor data from sensors 120*a*, 120*b* and camera data from cameras 130*a*, 130*b*, 130*c*, 130*d*. In some implementations, the cameras 130*a*, 130*b* may be configured to not capture video of the gate 106 opening when a human person is present in the autonomous vehicle 150 (as opposed to capturing camera data that is disregarded).

Figure 3D:
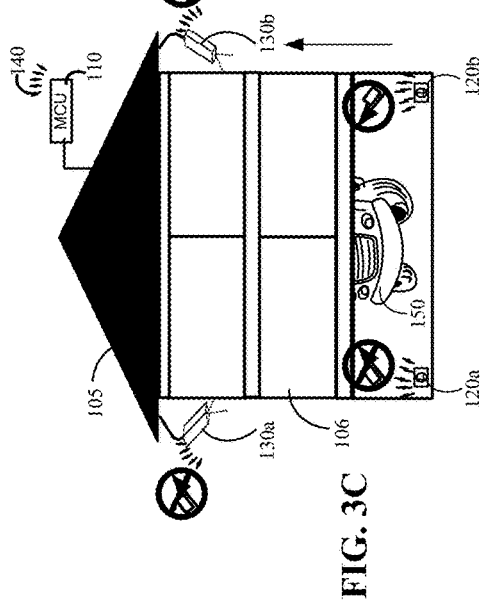

With reference to FIG. 3D, the gate 106 may be sufficiently open for the autonomous vehicle 150 to exit the garage 105. At this time, the motion sensor 120*a* may be disabled to allow the autonomous vehicle 150 to leave the garage 105 without triggering a false alarm. This scenario would create an opportunity for the trespasser 103 to enter into the opening created by the opened gate 106 and allow the trespasser to 103 to enter the garage 105. However, human occupant such as human person 102 can see the trespasser 103, and use a user device to transmit an instruction to the monitoring system control unit 110 (or monitoring application server 190) to generate data indicative of a potential alarm event at the property 101 based on the trespasser 103 attempting to sneak into the garage 105. A notification may be transmitted to the central alarm station server 192 based on the generated event, the detected trespasser, or both. The central alarm station server 192 may alert local authorities and request that local authorities deploy to the garage 105 of property 101.

The monitoring system control unit 110 (or monitoring application server 190) may perform other operations in response to the detection of the trespasser 103. For example, the monitoring system control unit 110 (or monitoring application server 190) can trigger an extremely loud audible alarm at the garage 105, the property 101, or both, in an effort to disable or disrupt the trespasser 103. Alternatively, or in addition, the monitoring system control unit 110 (or monitoring application server 190) may trigger lights (e.g., connected lights, extremely bright & connected strobe lights, etc.) to flash on and off, repeatedly, at the property to disorient the trespasser. The monitoring system control unit 110 (or monitoring application server 190) may instruct a flying drone (e.g., a quad-copter) to deploy and confront the trespasser 103 by outputting extremely loud music, flashing extremely bright lights, swarming the trespasser 103, or the like in an effort to chase the trespasser 103 away from the garage 105 or property 101. The flying drone may lock-on to the trespasser 103, follow the trespasser 103, and report the trespasser's 103 location to local authorities that can find the trespasser 103 and apprehend the trespasser 103 using location data from the flying drone. The flying drone can be stationed on a charging pad inside the garage 105 or on a charging pad outside the garage 105.

Alternatively, or in addition, in response to the detection of a potential alarm event (e.g., detection of a trespasser 103, detection of a potential burglar, detection of a broken window, detection of motion in the house when security system is in an armed-away state, detection of triggered contact sensor, or the like), the autonomous vehicle 150 can be used as an extension of the monitoring system controlled by the monitoring system control unit 110 (or monitoring application server 190). For example, after detecting a potential alarm event, the monitoring system control unit 110 (or monitoring application server 190) may communicate with the autonomous vehicle 150 to determine the location of the autonomous vehicle 150. If the monitoring system control unit 110 (or monitoring application server 190) determines that the autonomous vehicle 150 is located at the property 101 (or within a predetermined distances of the property 101), then the monitoring system control unit 110 (or monitoring application server 190) can trigger the autonomous vehicle's 150 car alarm and lights to off. This can result loud sounds and blinking lights that can attract attention to the property, scare the trespasser or burglar away, both, using highly audible and visible signals that can rouse neighbors and be detectable throughout the community. If the autonomous vehicle 150 is not within a predetermined distance of the property 101, then the monitoring system control unit 110, the monitoring application server 190, or both, may instruct the autonomous vehicle 150 to return to the property 101 and perform one or operations (e.g., sounding a car alarm, flashing lights, one or more of the operations described below, or the like).

The aforementioned description of FIGS. 3A to 3D describes a scenario wherein the monitoring system control unit 110 (or monitoring application server 190) determines to not use the gate 105 surveillance techniques described with reference to FIGS. 1 and 2A-2D because a human person is present the autonomous vehicle 150. However, the present disclosure need not be so limited. For example, in some implementations, the monitoring system control unit 110 (or monitoring application server 190) can use the same disaggregation techniques to monitor a gate 106 opening when a human occupant is present in the autonomous vehicle 150 as when there is no human occupant of the autonomous vehicle 150 as described with reference to FIGS. 1 and 2A-2D.

FIG. 4A is a contextual diagram of a system for gate 106 monitoring during arrival of an autonomous vehicle 150 at a gate when a human person is not present inside the autonomous vehicle 150.

The system shown in FIG. 4A is the same as system 100 described with reference to FIG. 1. However, only a portion of the system 100 is depicted in FIG. 4A to describe specific functionality of the system 100.

FIG. 4A is an example of a garage 105 whose gate 106 (e.g., garage door) is monitored by a monitoring system control unit 110 (or monitoring application server 190) during an autonomous vehicle's 150 return to the garage 105 from a different location (e.g., after an autonomous vehicle 150 has dropped off a human occupant at work and returned home to garage 105). The garage 105 shown in FIG. 4A is the same garage as shown in FIGS. 2A and 3A. However, FIG. 4A describes the operation of the system 100 in a different context than the system 100 in FIGS. 2B to 2D and 3B to 3D.

As the autonomous vehicle 150 approaches the garage 105, the monitoring system control unit 110 (or monitoring application server 190) may detect vehicle 150 based on data generated by one or more monitoring system components. For example, the monitoring system control unit 110 (or monitoring application server 190) may detect, based on sensor data from one or more sensors (e.g., motion sensors in a driveway), analysis of camera data (e.g., video, images, or both) from one or more cameras 130a, 130b, or a combination thereof, that a vehicle 150 is approaching the gate 106.

Based on detecting the vehicle 150, the one or more cameras 130a, 130b may capture camera data 132 (e.g., video, images, or both) of the autonomous vehicle 150, and broadcast the captured camera data 132 via the network 140. The monitoring system control unit 110 (or monitoring application server 190) detect the broadcasted camera data 132 and determine, based on the camera data 132, whether the autonomous vehicle 150 is an authorized autonomous vehicle 150 before opening the gate 106. For example, the monitoring system control unit 110 (or monitoring application server 190) can analyze the make of the autonomous vehicle, the model of the autonomous vehicle, the color of the vehicle, the license plate number of the autonomous vehicle, the vehicle identification number (VIN) for the vehicle, or a combination thereof, to determine if the autonomous vehicle 150 is authorized to pass through the gate 106. For example, the monitoring system control unit 110 (or monitoring application server 190) can obtain camera data representing one or more of the aforementioned characteristics (e.g., make, model, color, license plate number, vehicle identification number, or the like) and compare the aforementioned characteristics to data stored in respective records that each represent vehicles that are authorized to pass through the gate 106.

If the autonomous vehicle 150 is determined to be unauthorized to pass through the gate 106, the monitoring system control unit 110 (or monitoring application server 190) can perform one or more operations. For example, monitoring system control unit 110 (or monitoring application server 190) can determine to (i) not open the gate 106, (ii) transmit a notification indicative of an alarm event, (iii) trigger an audible alarm, or a combination thereof. Alternatively, if the monitoring system control unit 110 (or monitoring application server 190) determines that the autonomous vehicle 150 is an authorized autonomous vehicle 150, the monitoring system control unit 110 (or monitoring application server 190) can perform further security screening of the autonomous vehicle 150. Alternatively, in some implementations, the monitoring system control unit 110 (or monitoring application server 190) can instruct the gate 106 to open, without further security screening of the autonomous vehicle 150 based on determining that the autonomous vehicle 150 is authorized.

In some implementations, performing further security screening of the autonomous vehicle 150 may include determining whether the autonomous vehicle 150 includes an authorized occupant. The monitoring system control unit 110 (or monitoring application server 190) can determine whether the autonomous vehicle 150 includes an authorized occupant based on camera data 132, human occupancy data 152 broadcast by the autonomous vehicle 150, or a combination thereof. For example, the monitoring system control unit 190 (or monitoring application server or one or more cameras 130a, 130b) may perform facial recognition analysis on images of the vehicle occupant and determine whether the vehicle occupant's face matches one or more image models representing the face of authorized humans such as property residents. By way of another example, the monitoring system control unit 110 (or monitoring application server 190) may analyze human occupancy data from the autonomous vehicle 150 and determine whether the human occupancy data is indicative of an authorized human occupant. For example, the human occupancy data represents a human fingerprint of an authorized human occupant that includes weight, skin temperature, fingerprints, voiceprints, breathing rate, heart rate, other biometric features, or a combination thereof that can be compared against fingerprints of authorized human occupants. Though authorized human occupants may include a property resident, the present disclosure need not be so limited. For example, an authorized human occupant may include, for example, a dog walker, a house cleaner, a neighbor, a friend, or any other person that a resident of the property has authorized to access the property by storing data an image model, human fingerprint, or the like representing the human occupant in one or more components of the monitoring system and designating the stored data as an authorized occupant profile.

The monitoring system control unit 110 (or monitoring application server 190) may disaggregate (i) sensor data obtained from the one or more sensors 120a, 120b, 120c, 120c and (ii) camera data from the one or more cameras 130a, 130b, 130c, 130d based on the human occupancy of the autonomous vehicle 150. With reference to the example of FIG. 4A, the monitoring system control unit 110 (or monitoring application server 190) may determine based on the camera data 132, human occupancy data 152, or both, that the autonomous vehicle 150 does not include a human occupant. In response to the request to open the gate 106, the monitoring system control unit 110 (or monitoring application server 190) may begin to disregard sensor data from a subset of the sensors 120a, 120b, 120c, 120d in the garage so that the autonomous vehicle 150 can enter the garage 105, begin capturing and analyzing (in real-time or near real-time) camera data captured by the one or more cameras 130a, 130b with a line of sight of the gate 106 opening, and begin to open the garage door. The motion sensors 120a and the contact sensor 120b are depicted with an message and arrow in a circle with a line through it because, though the sensors 120a, 120b may be generating and broadcasting sensor data indicating, for example, that there is movement in the garage 105 and the contact sensor between the gate 106 and a surface of the garage 105 has been severed, the monitoring system control unit 110 (or monitoring application server 190) will disregard the sensor data from sensors 120a, 120b so that the autonomous vehicle 150 can enter into the garage 105 without triggering a false alarm. However, this scenario would create an opportunity for the trespasser 103 to enter into the opening created by the opened gate 106. As a result, with the motion sensor 120a and contact sensor 120b disabled, the trespasser to 103 can piggyback behind the autonomous vehicle 150 and enter the garage 105.

However, one or more of the cameras such as camera 130a may capture camera data such as video, image, or both that is streamed to the monitoring system control unit 110 (or monitoring application server 190) for analysis. The monitoring system control unit 110 (or monitoring application server 190) can perform video (or image) analytics on the streamed camera data to determine whether the camera data 132 depicts the presence of an object (e.g., a human person such as trespasser 103, an animal, or the like) in the camera data. With reference to the example of FIG. 4A, the monitoring system control unit (or monitoring application server 190) can determine that the camera data depicts a human person (e.g., trespasser 103).

In some implementations, the monitoring system control unit 110 (or monitoring application server 190) may broadcast data indicative of a potential alarm event based on the detection of a human person entering into the garage 105. Alternatively, or in addition, the monitoring system control unit 110 (or monitoring application server 190) may perform facial recognition analysis of one or more video, images, or both, in the camera data showing the face of a human person (e.g., a trespasser 103) and determine that the human person is not a legitimate occupant of the property 101. The monitoring system control unit (or monitoring application server 190) may generate data indicative of a potential alarm event at the property 101 based on detection of the trespasser 103 attempting to sneak into the garage 105. A notification 134 may be transmitted to the monitoring application server 190, the central alarm station server 192, or both, based on the generated data that is indicative of an event, the detected trespasser, or both. The central alarm station server 192 may alert local authorities and request that local authorities deploy to the garage 105 of property 101. Alternatively, or in addition, the monitoring system control unit 110 (or monitoring application server 190) may perform other operations in response to the detection of a potential trespasser such as trespasser 103 as described with reference to FIGS. 2 and 3.

FIG. 4B is a contextual diagram of a system 100 for gate 106 monitoring during arrival of an autonomous vehicle 150 at a gate 106 when a human person is present inside the autonomous vehicle 150.

The system shown in FIG. 4B is the same as system 100 described with reference to FIG. 1. However, only a portion of the system 100 is depicted in FIG. 4B to describe specific functionality of the system 100.

FIG. 4B is an example of a garage 105 whose gate 106 (e.g., garage door) is monitored by a monitoring system control unit 110 (or monitoring application server 190)

during an autonomous vehicle's 150 return to the garage 105 from a different location (e.g., after an autonomous vehicle 150 has picked up a human occupant at school and returned home to garage 105). The garage 105 shown in FIG. 4B is the same garage as shown in FIGS. 2A, 3A, and 4A. However, FIG. 4B describes the operation of the system 100 in a different context than the system 100 in FIGS. 2B to 2D, 3B to 3D, and 4A.

As the autonomous vehicle 150 approaches the garage 105, the monitoring system control unit 110 (or monitoring application server 190) may detect vehicle 150 based on data generated by one or more monitoring system components. For example, the monitoring system control unit 110 (or monitoring application server 190) may detect, based on sensor data from one or more sensors (e.g., motion sensors in a driveway), analysis of camera data (e.g., video, images, or both) from one or more cameras 130a, 130b, or a combination thereof, that a vehicle 150 is approaching the gate 106.

Based on detecting the vehicle 150, the one or more cameras 130a, 130b may capture camera data 132 (e.g., video, images, or both) of the autonomous vehicle 150, and broadcast the captured camera data 132 via the network 140. The monitoring system control unit 110 (or monitoring application server 190) detect the broadcasted camera data 132 and determine, based on the camera data 132, whether the autonomous vehicle 150 is an authorized autonomous vehicle 150 before opening the gate 106. For example, the monitoring system control unit 110 (or monitoring application server 190) can analyze the make of the autonomous vehicle, the model of the autonomous vehicle, the color of the vehicle, the license plate number of the autonomous vehicle, the vehicle identification number (VIN) for the vehicle, or a combination thereof, to determine if the autonomous vehicle 150 is authorized to pass through the gate 106. For example, the monitoring system control unit 110 (or monitoring application server 190) can obtain camera data representing one or more of the aforementioned characteristics (e.g., make, model, color, license plate number, vehicle identification number, or the like) and compare the aforementioned characteristics to data stored in respective records that each represent vehicles that are authorized to pass through the gate 106.

If the autonomous vehicle 150 is determined to be unauthorized to pass through the gate 106, the monitoring system control unit 110 (or monitoring application server 190) can perform one or more operations. For example, monitoring system control unit 110 (or monitoring application server 190) can determine to (i) not open the gate 106, (ii) transmit a notification indicative of an alarm event, (iii) trigger an audible alarm, or a combination thereof. Alternatively, if the monitoring system control unit 110 (or monitoring application server 190) determines that the autonomous vehicle 150 is an authorized autonomous vehicle 150, the monitoring system control unit 110 (or monitoring application server 190) can perform further security screening of the autonomous vehicle 150. Alternatively, in some implementations, the monitoring system control unit 110 (or monitoring application server 190) can instruct the gate 106 to open, without further security screening of the autonomous vehicle 150 based on determining that the autonomous vehicle 150 is authorized.

In some implementations, performing further security screening of the autonomous vehicle 150 may include determining whether the autonomous vehicle 150 includes an authorized occupant. The monitoring system control unit 110 (or monitoring application server 190) can determine whether the autonomous vehicle 150 includes an authorized occupant based on camera data 132, human occupancy data 152 broadcast by the autonomous vehicle 150, or a combination thereof. The monitoring system control unit 110 (or monitoring application server 190) may disaggregate (i) sensor data obtained from the one or more sensors 120a, 120b, 120c, 120c and (ii) camera data from the one or more cameras 130a, 130b, 130c, 130d based on the human occupancy of the autonomous vehicle 150. With reference to the example of FIG. 4B, the monitoring system control unit 110 (or monitoring application server 190) may determine based on the camera data 132, human occupancy data 152, or both, that the autonomous vehicle 150 includes a human occupant 102.

In response to the request to open the gate 106, the monitoring system control unit 110 (or monitoring application server 190) may determine that autonomous vehicle 150 has a human occupant and that the autonomous vehicle 150 has broadcasted a request to open the gate 106 so that the autonomous vehicle can enter the garage 105. In response to the request to open the gate 106 and after determining that the autonomous vehicle 150 and the human occupant 102 of the autonomous vehicle 150 are authorized, the monitoring system control unit 110 (or monitoring application server 190) may begin to disregard sensor data from each of the sensors 120a, 120b, 120c, 120d in the garage so that the autonomous vehicle 150 can leave the garage 105 and disregard camera data captured by the one or more cameras 130a, 130b, 130c, 130d. The monitoring system control unit 110 (or monitoring application server 190) disregards sensor data from each of the sensors 120a, 120b, 120c, 120d and disregards camera data from each of the one or more cameras 130a, 130b, 130c, 130d because a human occupant 102 is present in the autonomous vehicle 150. In FIG. 4B, the motion sensor 120a, the contact sensor 120b, and the cameras 130a, 130b are depicted with a message and arrow in a circle with a line through it because the monitoring system control unit 110 (or monitoring application server 190) will disregard sensor data from sensors 120a, 120b and camera data from cameras 130a, 130b, 130c, 130d. In some implementations, the cameras 130a, 130b may be configured to not capture video of the gate 106 opening when a human person is present in the autonomous vehicle 150 (as opposed to capturing camera data that is disregarded).

With reference to 4B, the gate 106 may be sufficiently opened for the autonomous vehicle 150 to enter the garage 105. At this time, the motion sensor 120a may be disabled to allow the autonomous vehicle 150 to leave the garage 105 without triggering a false alarm. This scenario would create an opportunity for the trespasser 103 to enter into the opening created by the opened gate 106 and allow the trespasser to 103 to enter the garage 105. However, human occupant such as human person 102 can see the trespasser 103, and use a user device to transmit an instruction to the monitoring system control unit 110 (or monitoring application server 190) to generate data indicative of a potential alarm event at the property 101 based on the trespasser 103 attempting to sneak into the garage 105. A notification may be transmitted to the central alarm station server 192 based on the generated event, the detected trespasser, or both. The central alarm station server 192 may alert local authorities and request that local authorities deploy to the garage 105 of property 101. Alternatively, or in addition, the monitoring system control unit 110 (or monitoring application server 190) may perform other operations in response to the detection of a potential trespasser such as trespasser 103 as described with reference to FIGS. 2 and 3.

The aforementioned description of FIG. 4B describes a scenario wherein the monitoring system control unit 110 (or monitoring application server 190) determines to not use the gate 105 surveillance techniques described with reference to FIG. 4A because a human person is present the autonomous vehicle 150. However, the present disclosure need not be so limited. For example, in some implementations, the monitoring system control unit 110 (or monitoring application server 190) can use the same disaggregation techniques to monitor a gate 106 opening when a human occupant is present in the vehicle as when there is no human occupant of the autonomous vehicle 150 as described with reference to FIG. 4A.

Figure 5:
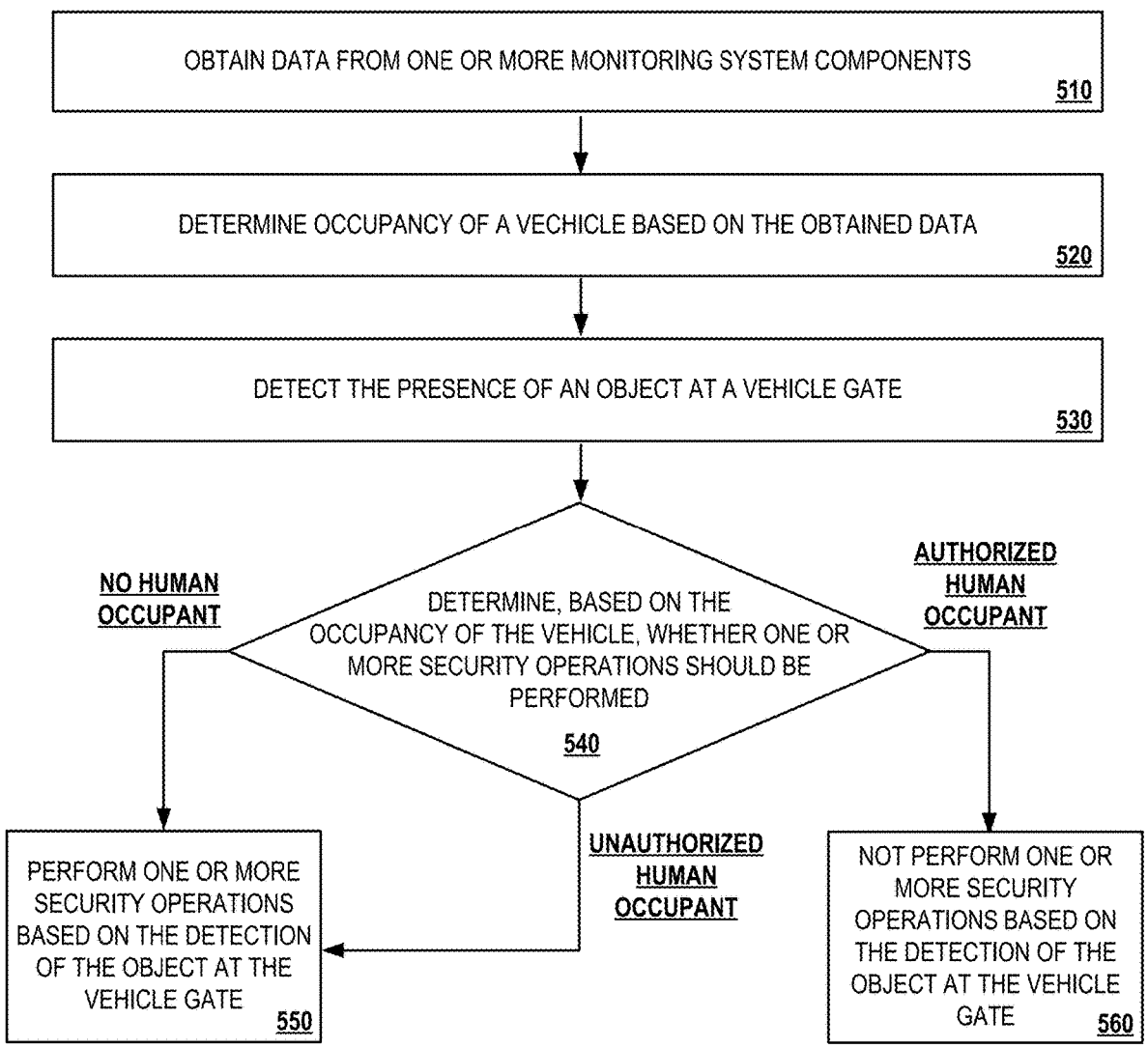
FIG. 5 is a flowchart of a process for monitoring a gate during arrival or departure of an autonomous vehicle.

FIG. 5 is a flowchart of a process 500 for monitoring a gate during arrival or departure of an autonomous vehicle. Generally, the process 500 may include obtaining data a from one or more monitoring system components (510), determining occupancy of a vehicle based on the obtained data (520), detecting the presence of an object at a vehicle gate (530), and determining, based on the occupancy of the vehicle, whether to perform one or more security operations based on the detection of object at the vehicle gate (540). In response to determining that (i) there is no human occupant in the vehicle and (ii) an object was detected at the vehicle gate, the process 500 continues by performing one or more security operations based on the detection of the object at the vehicle gate (550). In response to determining that there is an unauthorized human occupant in the vehicle, the process 500 continues by performing one or more security operations based on the detection of the human person at the vehicle gate (550). In response to determining that there is an authorized human occupant in the vehicle, the process 500 continues by not performing one or more security operations based on the detection of the object at the vehicle gate (560). For convenience, the process 500 will be described as being performed by a monitoring unit such as a monitoring system control unit 110 or monitoring application server 190 described with reference to FIGS. 1, 2A-2D, 3A-3D, 4A, and 4B.

In more detail, a monitoring unit can obtain 510 data from one or more monitoring system components. For example, the monitoring unit may detect sensor data broadcast by one or more sensors installed in (or around) a garage, in (or around) a property associated with the garage, or a combination thereof. For example, the monitoring unit may detect sensor data broadcast by one or more motion sensors, one or more temperature sensors, or both.

Alternatively, or in addition, the monitoring unit may detect camera data broadcast one or more cameras in (or around) the garage. For example, the monitoring unit may detect video, images, or both. The video, images, or both may include high-resolution (e.g., higher than 720p) video, images, or both, standard-definition (e.g., lower than 720p) video, images, or both, thermal video, images, or both, from a solar camera. In some implementations, the received camera data need not include an image, video, or both. Instead, the camera data may include data representing a determination by a camera as to whether an image, video, or both, generated by the camera depicts an object such as a human object in a vehicle. For example, the camera data received, by the monitoring unit and from the camera may represent whether the camera determined that (i) a vehicle includes a human object, (ii) a vehicle includes an authorized human object, (iii) a vehicle includes a human object that is not authorized, (iv) a vehicle does not include a human object, or the like.

Alternatively, or in addition, the monitoring unit may detect human occupancy data broadcast by a vehicle. Human occupancy data may include a data generated by a computing system of the vehicle that represents a determination, by the computing system of the vehicle, that (i) the vehicle includes a human object, (ii) the vehicle includes an authorized human object, (iii) the vehicle includes a human object that is not authorized, (iv) the vehicle does not include a human object, or the like. The computing system of vehicle may make such determinations based on sensor data generated by one or more vehicle sensors, camera data generated by one or more vehicle cameras, or a combination thereof. In some implementations, the human occupancy data may represent determinations on human occupancy made by the computing system of the vehicle. In other implementations, human occupancy data may include sensor data or camera data is provided to the monitoring unit for analysis to determine whether the sensor data or camera data generated by one or more vehicle cameras, one or more vehicle sensors, or both, indicates that (i) the vehicle includes a human object, (ii) the vehicle includes an authorized human object, (iii) the vehicle includes a human object that is not authorized, (iv) the vehicle does not include a human object, or the like. The vehicle may include an autonomous vehicle, a connected vehicle, or both.

The monitoring unit can determine 520 occupancy of a vehicle based on the obtained data. Determining the occupancy of the vehicle may include, for example, determining whether there is one or more human persons inside the vehicle. In some implementations, for example the monitoring unit may determine whether there is one or more human persons inside the vehicle based on analysis of (i) movement near a vehicle (e.g., within a predetermined amount of time of the vehicle starting its engines), (ii) temperature changes in the garage (e.g., within a predetermined amount of time of the vehicle starting its engines), (iii) objects in camera data (e.g., videos, images, or both) in a vehicle (e.g., after the vehicle has started its engines) or around the vehicle (e.g., within a predetermined amount of time of the vehicle starting its engines, (iv) camera data representing a determination by a camera regarding human occupancy of the vehicle, (iv) human occupancy data sensor data generated one or more vehicle sensors, one or more vehicle cameras, or both, or (vi) human occupancy data representing a determination by the vehicle as to whether the vehicle includes a human person. In some instances, the monitoring unit may determine that the vehicle does not include a human occupant and then perform the process described at stage 530. In other instances, the monitoring unit may determine that the vehicle does not include a human occupant.

The monitoring unit can detect 530 the presence of an object at a vehicle gate. The object may be any object such as a human person, an animal, or an inanimate object. For example, the monitoring unit can detect the presence of a human person at a vehicle gate by analyzing camera data captured by one or more cameras configured to monitoring an opening in the vehicle gate after the gate starts to open so that the vehicle can pass through the vehicle gate. Analyzing the camera data may include, for example, performing video analytics to determine whether one or more objects (e.g., human persons, animals, or the like) are depicted by the camera data.

The monitoring unit can determine 540 based on the occupancy of the vehicle, whether to perform one or more security operations based on the detection of the object at the vehicle gate.

In response to determining that (i) there is no human occupant in the vehicle and (ii) an object was detected at the vehicle gate, the monitoring unit can perform 550 one or more security operations based on the detection of the object at the vehicle gate. The one or more security operations may include, for example, transmitting a notification indicative of an alarm event to alert a monitoring station that an object was detected at the vehicle gate. Alternatively, or in addition, the one or more security operations may include transmitting a notification indicative of an alarm event to a user device of a user to alert the user that an object was detected at the vehicle gate. Alternatively, or in addition, the one or more security operations may include transmitting a notification to one or more law enforcement agencies to notify the law enforcement agency that an object was detected at the vehicle gate. Any of the aforementioned notifications may trigger the dispatch of law enforcement authorities to the property where the object was detected. Alternatively, or in addition, the one or more security operations may include triggering an audible alarm. Alternatively, or in addition, the one or more security operations may include dispatching a drone device to capture images or videos of the detected object. Alternatively, or in addition, the one or more security operations may include dispatching a drone device to lock onto and follow the detected object. In some implementations, when the monitoring unit determines that the detected object is a human person, the security operations may include performing facial recognition analysis on images captured of the face of an object such as a human person detected at the vehicle gate, or a combination thereof.

In response to determining that there is an unauthorized human occupant in the vehicle, the monitoring unit can perform 550 one or more security operations based on the detection of the human person at the vehicle gate. The one or more security operations may include, for example, transmitting a notification indicative of an alarm event to alert a monitoring station that an object was detected at the vehicle gate. Alternatively, or in addition, the one or more security operations may include transmitting a notification indicative of an alarm event to a user device of a user to alert the user that an object was detected at the vehicle gate. Alternatively, or in addition, the one or more security operations may include transmitting a notification to one or more law enforcement agencies to notify the law enforcement agency that an object was detected at the vehicle gate. Any of the aforementioned notifications may trigger the dispatch of law enforcement authorities to the property where the object was detected. Alternatively, or in addition, the one or more security operations may include triggering an audible alarm. Alternatively, or in addition, the one or more security operations may include dispatching a drone device to capture images or videos of the detected object. Alternatively, or in addition, the one or more security operations may include dispatching a drone device to lock onto and follow the detected object. In some implementations, when the monitoring unit determines that the detected object is a human person, the security operations may include performing facial recognition analysis on images captured of the face of an object such as a human person detected at the vehicle gate, or a combination thereof.

In response to determining that there is an authorized human occupant, the monitoring unit will not perform 560 one or more security operations based on the detection of a human person at the vehicle gate. Not performing one or more security operations may include, for example, disregarding data indicative of the detection of human person at the vehicle gate. For example, the monitoring unit may ignore sensor data, camera data, or both that are generated by the sensors in (or around) the garage, cameras in (or around) the garage, or both, when an authorized human user is determined to be occupying the vehicle.

Figure 6:
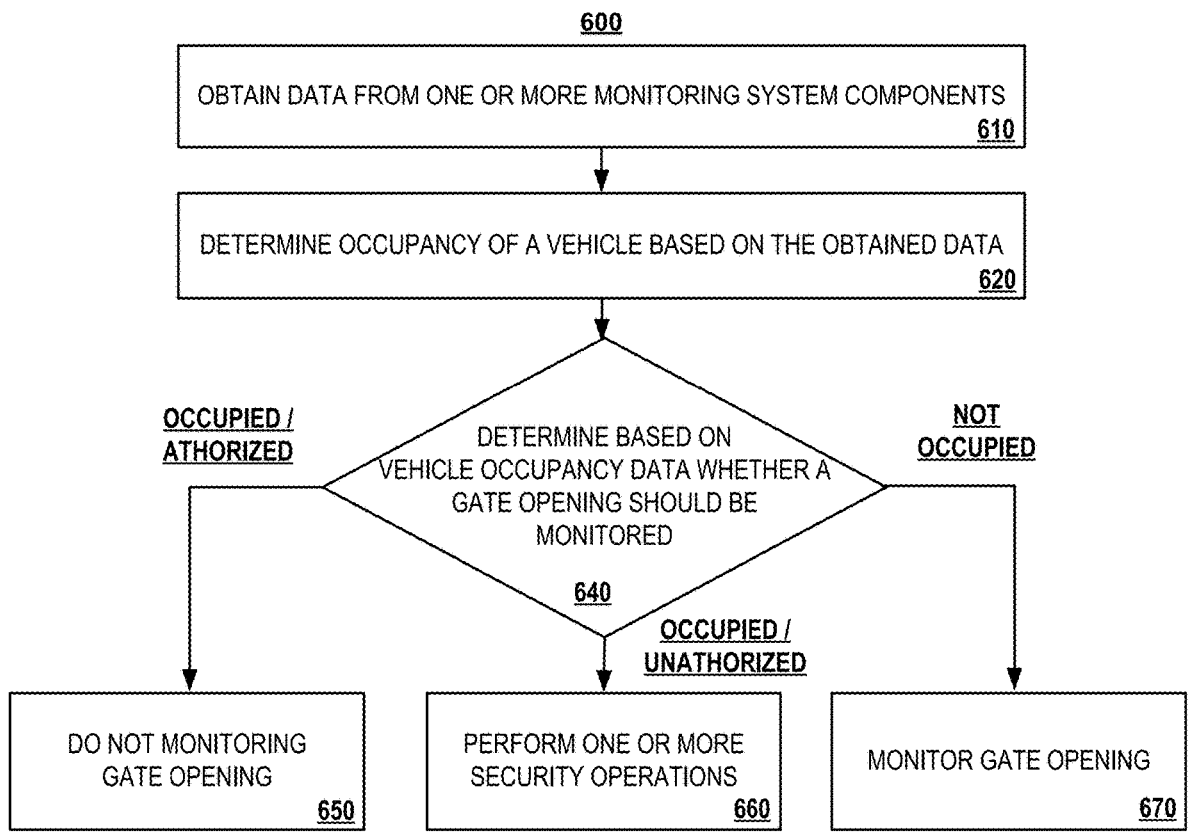
FIG. 6 is a flowchart of another process for monitoring a gate during departure of an autonomous vehicle.

FIG. 6 is a flowchart of another process 600 for determining whether a gate opening should be monitored during departure of an autonomous vehicle. Generally, the process 600 may include obtaining data from one or more monitoring system components (610), determining occupancy of a vehicle based on the obtained data (620), and determining, based on vehicle occupancy data, whether a gate opening should be monitored (630). In response to determining that the vehicle is occupied by an authorized human occupant, the process 600 continues at stage 640 by not monitoring the gate opening. In response to determining that the vehicle is occupied by an unauthorized human occupant, the process 600 continues at stage 650 by performing one or more security operations (650). In response to determining that the vehicle is not occupied by any human occupant, the process 600 continues at stage 650 by monitoring the gate opening. For convenience, the process 600 will be described as being performed by a monitoring unit such as a monitoring system control unit 110 or monitoring application server 190 described with reference to FIGS. 1, 2A-2D, 3A-3D, 4A, and 4B.

In more detail, a monitoring unit can obtain 610 data from one or more monitoring system components. For example, the monitoring unit may detect sensor data broadcast by one or more sensors installed in (or around) a garage, in (or around) a property associated with the garage, or a combination thereof. For example, the monitoring unit may detect sensor data broadcast by one or more motion sensors, one or more temperature sensors, or both.

Alternatively, or in addition, the monitoring unit may detect camera data broadcast one or more cameras in (or around) the garage. For example, the monitoring unit may detect video, images, or both. The video, images, or both may include high-resolution (e.g., higher than 720p) video, images, or both, standard-definition (e.g., lower than 720p) video, images, or both, thermal video, images, or both, from a solar camera. In some implementations, the received camera data need not include an image, video, or both. Instead, the camera data may include data representing a determination by a camera as to whether an image, video, or both, generated by the camera depicts an object such as a human object in a vehicle. For example, the camera data received, by the monitoring unit and from the camera may represent whether the camera determined that (i) a vehicle includes a human object, (ii) a vehicle includes an authorized human object, (iii) a vehicle includes a human object that is not authorized, (iv) a vehicle does not include a human object, or the like.

Alternatively, or in addition, the monitoring unit may detect human occupancy data broadcast by a vehicle. Human occupancy data may include a data generated by a computing system of the vehicle that represents a determination, by the computing system of the vehicle, that (i) the vehicle includes a human object, (ii) the vehicle includes an authorized human object, (iii) the vehicle includes a human object that is not authorized, (iv) the vehicle does not include a human object, or the like. The computing system of vehicle may make such determinations based on sensor data generated by one or more vehicle sensors, camera data generated by one or more vehicle cameras, or a combination thereof. In some implementations, the human occupancy data may represent determinations on human occupancy made by the computing system of the vehicle. In other implementations, human occupancy data may include sensor data or camera data is provided to the monitoring unit for analysis to determine whether the sensor data or camera data generated by one or more vehicle cameras, one or more vehicle sensors, or both, indicates that (i) the vehicle includes a human object, (ii) the vehicle includes an authorized human object, (iii) the vehicle includes a human object that is not authorized, (iv) the vehicle does not include a human object, or the like. The vehicle may include an autonomous vehicle, a connected vehicle, or both.

The monitoring unit can determine 620 occupancy of a vehicle based on the obtained data. Determining the occupancy of the vehicle may include, for example, determining whether there is one or more human persons inside the vehicle. In some implementations, for example the monitoring unit may determine whether there is one or more human persons inside the vehicle based on analysis of (i) movement near a vehicle (e.g., within a predetermined amount of time of the vehicle starting its engines), (ii) temperature changes in the garage (e.g., within a predetermined amount of time of the vehicle starting its engines), (iii) objects in camera data (e.g., videos, images, or both) in a vehicle (e.g., after the vehicle has started its engines) or around the vehicle (e.g., within a predetermined amount of time of the vehicle starting its engines, (iv) camera data representing a determination by a camera regarding human occupancy of the vehicle, (iv) human occupancy data sensor data generated one or more vehicle sensors, one or more vehicle cameras, or both, or (vi) human occupancy data representing a determination by the vehicle as to whether the vehicle includes a human person.

In some implementations, the monitoring unit may determine the occupancy of a vehicle in response to the detection of the vehicle moving within a predetermine vicinity of the gate opening. For example, the monitoring unit may determine that a vehicle is moving towards the gate opening, and responsive to the detection of the vehicle moving towards the gate opening, the monitoring unit can determine whether the vehicle includes an occupant. In yet other implementations, the monitoring may determine occupancy of a vehicle in response to a determination by the monitoring unit that the vehicle has been started (e.g., the engine of the vehicle has turned on). The vehicle may be connected to the monitoring unit via one or more networks and use the network to communicate changes in the vehicle status such as engine on, engine off, vehicle moving, vehicle stopped, etc. when the vehicle is within a predetermined vicinity of the property monitored by the monitoring unit.

The monitoring unit can determine 630, based on the vehicle occupancy data whether a gate opening should be monitored.

In response to determining that the vehicle is occupied by an authorized human occupant, the monitoring unit does not 640 monitor the gate opening. Not monitoring the gate opening may include, for example, disregarding data indicative of the detection of human person (or other object) at the vehicle gate. For example, the monitoring unit may ignore sensor data, camera data, or both that are generated by the sensors in (or around) the garage, cameras in (or around) the garage, or both, when an authorized human user is determined to be occupying the vehicle.

In response to determining that the vehicle is occupied by an unauthorized human occupant, the monitoring unit performs 650 one or more security operations. The one or more security operations may include, for example, transmitting a notification indicative of an alarm event to alert a monitoring station that an authorized human occupant is occupying the vehicle. Alternatively, or in addition, the one or more security operations may include triggering an audible alarm. Alternatively, or in addition, the security operations may include performing facial recognition analysis on images captured of the face of the unauthorized occupant of the vehicle. Alternatively, or in addition, the one or more security operations may include transmitting an instruction to the vehicle that disables the vehicle.

In response to determining that the vehicle is not occupied by any human occupant, the monitoring unit can monitor 650 the gate opening. Monitoring the gate opening may include, for example, disregarding sensor data from only a subset of a plurality of sensors in a garage. For example, the monitoring unit can disregard sensor data from one or more motion sensors, one or more contact sensors, or the like in order to allow the vehicle to exit the garage. Alternatively, or in addition, monitoring the gate opening can include, for example, capturing camera data (e.g., video, images, or the like) of a gate opening that is created when the gate opens to allow the vehicle to leave. Alternatively, or in addition, monitoring the gate opening may include analyzing the camera data to determine whether the camera data depicts one or more objects. For example, the camera data can be analyzed to determine whether any human persons, animals, or other objects have been detected in the vicinity of the gate opening. An object may be determined to be in the vicinity of the gate opening if, for example, the object approached the gate opening, entered into a garage (or other portion of a property) via the gate opening, was within a predetermined distance of the gate opening, or the like. In response to determining that an object was detected in the vicinity of the gate opening, the monitoring unit may perform one or more security operations.

The one or more security operations may include, for example, transmitting a notification indicative of an alarm event to alert a monitoring station that an object was detected in the vicinity of the gate opening. Alternatively, or in addition, the one or more security operations may include triggering an audible alarm. In some implementations, when the monitoring unit determines that the detected object is a human person, the security operations may include performing facial recognition analysis on images captured of the face of an object such as a human person detected at the vehicle gate, or a combination thereof.

Figure 7:
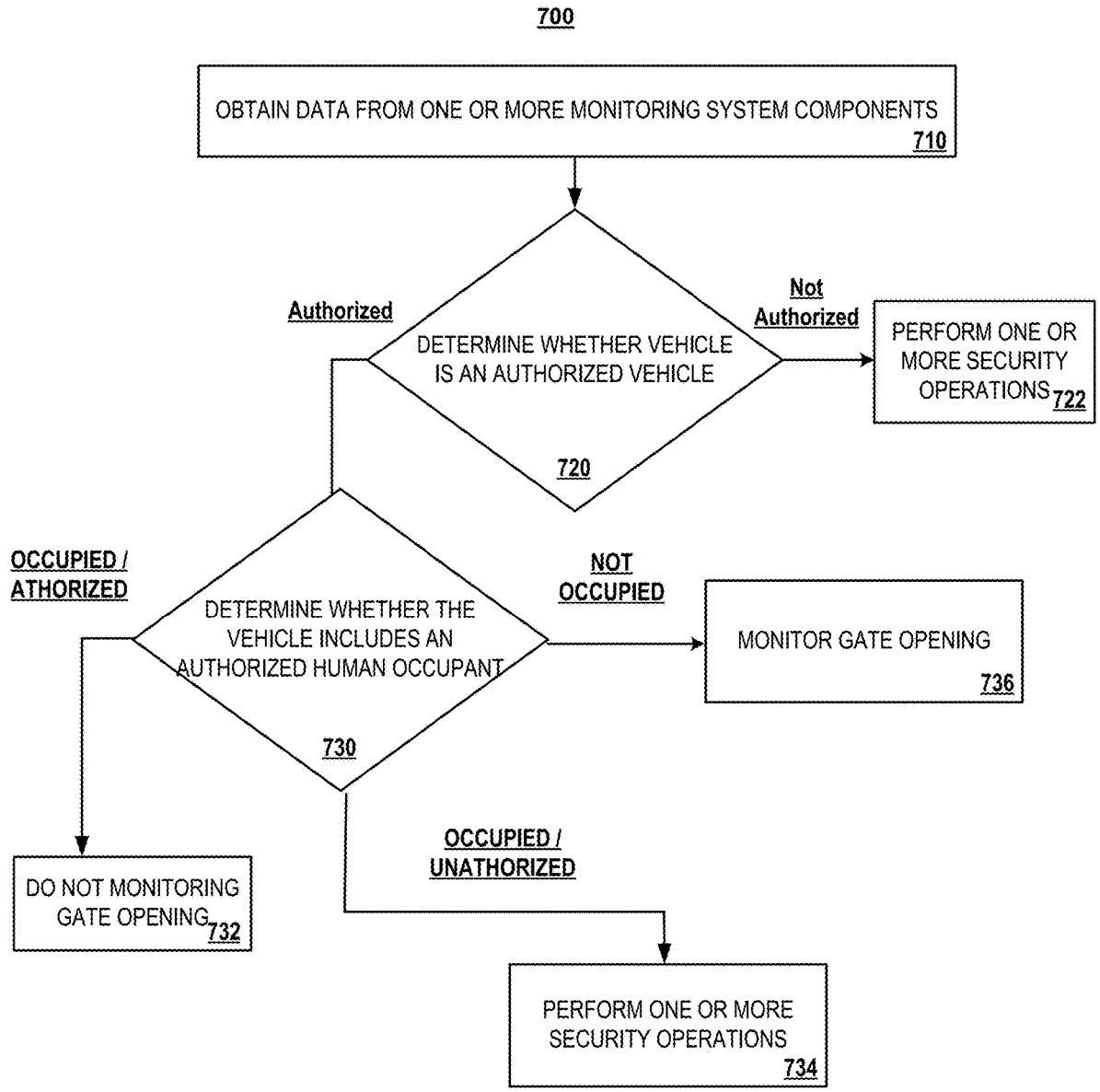
FIG. 7 is a flowchart of another process for monitoring a gate during arrival of an autonomous vehicle.

FIG. 7 is a flowchart of another process 700 for monitoring a gate during arrival of an autonomous vehicle. Generally, the process 700 may include obtaining data from one or more monitoring system components (710) and determining whether the vehicle is an authorized vehicle (720). In response to determining that the vehicle is not an authorized vehicle, the process 700 continues by performing one or more security operations based on detecting the unauthorized vehicle (722). In response to determining that the vehicle is an authorized vehicle, the process 700 continues by determining whether the vehicle includes an authorized human occupant (730). In response to determining that the vehicle includes an authorized occupant, the process 700 continues by not monitoring a gate opening (732). In response to determining that the vehicle includes an unauthorized occupant, the process 700 continues by performing one or more security operations (734). In response to determining that the vehicle does not include a human occupant, the process 700 continues by monitoring the gate opening (736). For convenience, the process 700 will be described as being performed by a monitoring unit such as a monitoring system control unit 110 or monitoring application server 190 described with reference to FIGS. 1, 2A-2D, 3A-3D, 4A, and 4B.

In more detail, a monitoring unit can obtain 710 data from one or more monitoring system components. For example, the monitoring unit may detect sensor data broadcast by one or more sensors installed in (or around) a garage, in (or around) a property associated with the garage, or a combination thereof. For example, the monitoring unit may detect sensor data broadcast by one or more motion sensors, one or more temperature sensors, or both.

Alternatively, or in addition, the monitoring unit may detect camera data broadcast one or more cameras in (or around) the garage. For example, the monitoring unit may detect video, images, or both. The video, images, or both may include high-resolution (e.g., higher than 720p) video, images, or both, standard-definition (e.g., lower than 720p) video, images, or both, thermal video, images, or both, from a solar camera. In some implementations, the received camera data need not include an image, video, or both. Instead, the camera data may include data representing a determination by a camera as to whether an image, video, or both, generated by the camera depicts an object such as a human object in a vehicle. For example, the camera data received, by the monitoring unit and from the camera may represent whether the camera determined that (i) a vehicle includes a human object, (ii) a vehicle includes an authorized human object, (iii) a vehicle includes a human object that is not authorized, (iv) a vehicle does not include a human object, or the like.

Alternatively, or in addition, the monitoring unit may detect human occupancy data broadcast by a vehicle. Human occupancy data may include a data generated by a computing system of the vehicle that represents a determination, by the computing system of the vehicle, that (i) the vehicle includes a human object, (ii) the vehicle includes an authorized human object, (iii) the vehicle includes a human object that is not authorized, (iv) the vehicle does not include a human object, or the like. The computing system of vehicle may make such determinations based on sensor data generated by one or more vehicle sensors, camera data generated by one or more vehicle cameras, or a combination thereof. In some implementations, the human occupancy data may represent determinations on human occupancy made by the computing system of the vehicle. In other implementations, human occupancy data may include sensor data or camera data is provided to the monitoring unit for analysis to determine whether the sensor data or camera data generated by one or more vehicle cameras, one or more vehicle sensors, or both, indicates that (i) the vehicle includes a human object, (ii) the vehicle includes an authorized human object, (iii) the vehicle includes a human object that is not authorized, (iv) the vehicle does not include a human object, or the like. The vehicle may include an autonomous vehicle, a connected vehicle, or both.

The monitoring system may can determine 720 whether the vehicle is an authorized vehicle. For example, the monitoring unit can analyze the make of the vehicle, the model of the vehicle, the color of the vehicle, the license plate number of the autonomous vehicle, the vehicle identification number (VIN) for the vehicle, or a combination thereof, to determine if the vehicle is authorized to pass through the gate. For example, the monitoring unit can obtain camera data representing one or more of the aforementioned characteristics (e.g., make, model, color, license plate number, vehicle identification number, or the like) and compare the aforementioned characteristics to data stored in respective records that each represent vehicles that are authorized to pass through the gate.

In response to determining that the vehicle is not an authorized vehicle, monitoring unit performs 722 one or more security operations based on detecting the unauthorized vehicle. The one or more security operations may include, for example, transmitting a notification indicative of an alarm event to alert a monitoring station that an authorized human unauthorized vehicle is attempting to pass through a gate. Alternatively, or in addition, the one or more security operations may include triggering an audible alarm.

In response to determining that the vehicle is an authorized vehicle, the monitoring unit determines 730 whether the vehicle includes an authorized human occupant. The monitoring unit can determine whether the vehicle includes an authorized occupant based on camera data (e.g., video, images, or both) captured by one or more cameras in the vicinity of the gate, human occupancy data broadcast by the vehicle (e.g., images from cameras inside the vehicle, audio recordings obtained from microphones inside the vehicle, user interaction with the vehicle (e.g., type of data a user inputs into the vehicle such as a security code, home address, personal identification number, password, or the like)), or a combination thereof. In some implementations, the monitoring unit can perform facial recognition analysis of images of a vehicle occupant's face, voiceprint analysis of the vehicle occupant's voice, evaluate other input provided by the vehicle occupant to the vehicle, or a combination thereof. The monitoring unit can then determine, based on the facial recognition analysis, voiceprint analysis, evaluation of other input, or a combination thereof, whether the vehicle occupant is an authorized human occupant.

In response to determining that the vehicle includes an authorized occupant, the monitoring unit does not monitor 732 a gate opening. Not monitoring the gate opening may include, for example, disregarding data indicative of the detection of human person (or other object) at the vehicle gate. For example, the monitoring unit may ignore sensor data, camera data, or both that are generated by the sensors in (or around) the garage, cameras in (or around) the garage, or both, when an authorized human user is determined to be occupying the vehicle.

In response to determining that the vehicle includes an unauthorized occupant, the monitoring unit performs 734 one or more security operations. The one or more security operations may include, for example, transmitting a notification indicative of an alarm event to alert a monitoring station that an authorized human occupant is occupying the vehicle. Alternatively, or in addition, the one or more security operations may include triggering an audible alarm. Alternatively, or in addition, the security operations may include performing facial recognition analysis on images captured of the face of the unauthorized occupant of the vehicle. Alternatively, or in addition, the one or more security operations may include transmitting an instruction to the vehicle that disables the vehicle.

In response to determining that the vehicle does not include a human occupant, the monitoring unit monitors 736 the gate opening. Monitoring the gate opening may include, for example, disregarding sensor data from only a subset of a plurality of sensors in (or around) a garage. For example, the monitoring unit can disregard sensor data from one or more motion sensors, one or more contact sensors, or the like in order to allow the vehicle to enter the garage. Alternatively, or in addition, monitoring the gate opening can include, for example, capturing camera data (e.g., video, images, or the like) of a gate opening that is created when the gate opens to allow the vehicle to enter. Alternatively, or in addition, monitoring the gate opening may include analyzing the camera data to determine whether the camera data depicts one or more objects. For example, the camera data can be analyzed to determine whether any human persons, animals, or other objects have been detected in the vicinity of the gate opening. An object may be determined to be in the vicinity of the gate opening if, for example, the object approached the gate opening, entered into a garage (or other portion of a property) via the gate opening, was within a predetermined distance of the gate opening, or the like. In response to determining that an object was detected in the vicinity of the gate opening, the monitoring unit may perform one or more security operations.

The one or more security operations may include, for example, transmitting a notification indicative of an alarm event to alert a monitoring station that an object was detected in the vicinity of the gate opening. Alternatively, or in addition, the one or more security operations may include triggering an audible alarm. In some implementations, when the monitoring unit determines that the detected object is a human person, the security operations may include performing facial recognition analysis on images captured of the face of an object such as a human person detected at the vehicle gate, or a combination thereof.

Figure 8:
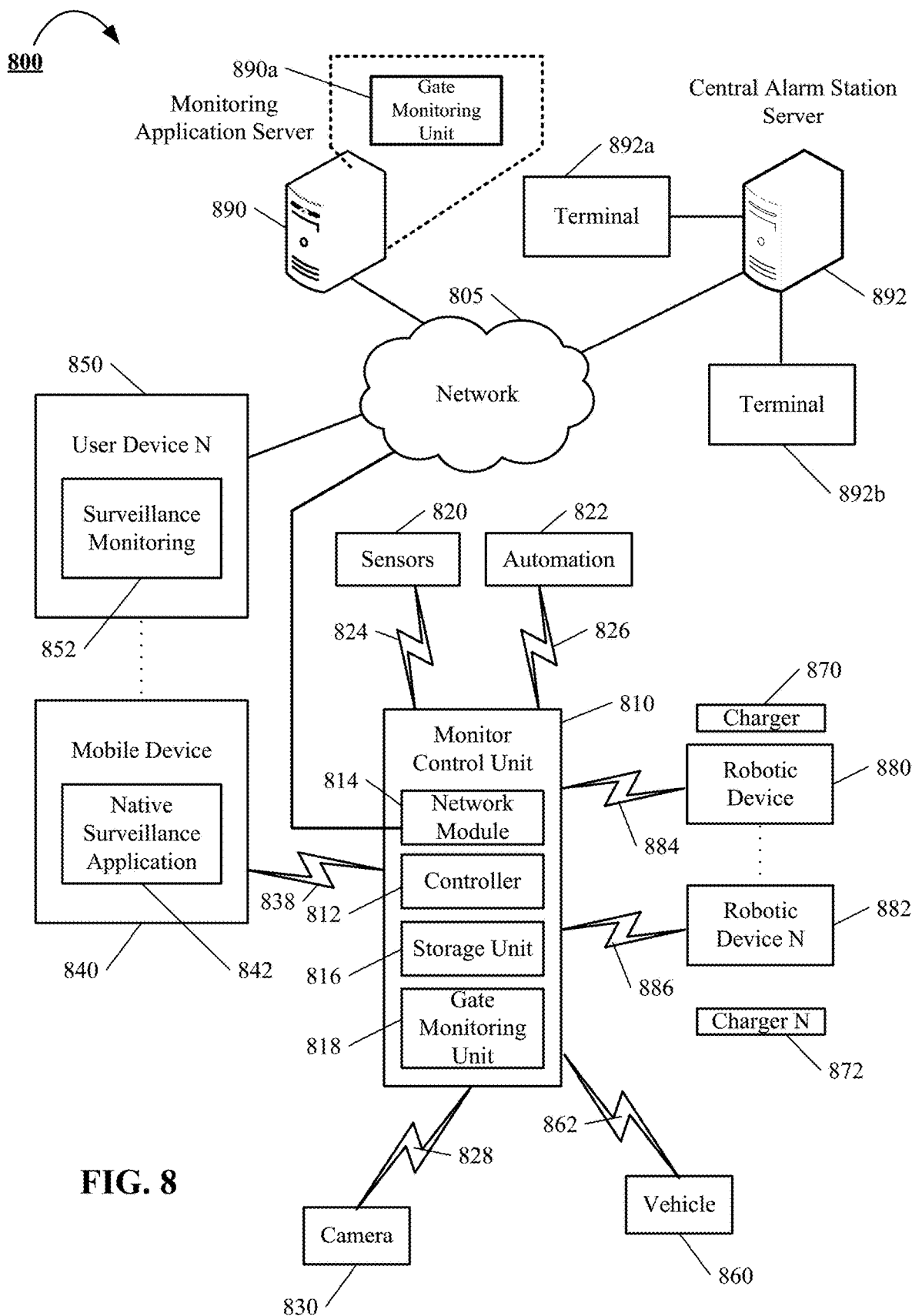
FIG. 8 is a block diagram of system components that can be used to monitor a gate during arrival or departure of an autonomous vehicle.

FIG. 8 is a block diagram of system components that can be used to monitor a gate during arrival or departure of an autonomous vehicle.

The electronic system 800 includes a network 805, a monitoring system control unit 810, one or more user devices 840, 850, a monitoring application server 890, and a central alarm station server 892. In some examples, the network 805 facilitates communications between the monitoring system control unit 810, the one or more user devices 840, 850, the monitoring application server 890, and the central alarm station server 892.

The network 805 is configured to enable exchange of electronic communications between devices connected to the network 805. For example, the network 805 may be configured to enable exchange of electronic communications between the monitoring system control unit 810, the one or more user devices 840, 850, the monitoring application server 890, and the central alarm station server 892. The network 805 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 805 may include multiple networks or subnetworks, each of which may include, for example, a wired or wireless data pathway. The network 805 may include a circuit-switched network, a packet-switched data network, or any other network able to carry electronic communications (e.g., data or voice communications). For example, the network 805 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 805 may include one or more networks that include wireless data channels and wireless voice channels. The network 805 may be a wireless network, a broadband network, or a combination of networks including a wireless network and a broadband network.

The monitoring system control unit 810 includes a controller 812, a network module 814, and storage unit 816. The controller 812 is configured to control a monitoring system (e.g., a home alarm or security system) that includes the monitoring system control unit 810. In some examples, the controller 812 may include a processor or other control circuitry configured to execute instructions of a program that controls operation of an alarm system. In these examples, the controller 812 may be configured to receive input from sensors, detectors, or other devices included in the alarm system and control operations of devices included in the alarm system or other household devices (e.g., a thermostat, an appliance, lights, etc.). For example, the controller 812 may be configured to control operation of the network module 814 included in the monitoring system control unit 810.

The monitoring system control unit 810 may also include a gate monitoring unit 818. The gate monitoring unit 818 may include software code stored in a memory unit that, when executed by the processor (or other control circuitry) of the monitoring system control unit 810 realizes programmed functionality that performs the operations described with reference to FIGS. 1, 2A-2D, 3A-3D, 4A, 4B, and 5-7. For example, the gate monitoring unit 818 may be configured determine the occupancy of a vehicle based on sensor data from sensors in or around a garage, camera data from cameras in or around a garage, human occupancy data from a vehicle, or a combination thereof. The gate monitoring unit 818 can disaggregate the sensor data and camera data base on the occupancy of the vehicle. The gate monitoring unit 818 can also determine whether a vehicle is an authorized vehicle that can enter a garage, whether an occupant of the vehicle is an authorized occupant, or a combination thereof. The gate monitoring unit 818 can monitor a gate opening by analyzing camera data that is captured of a gate opening and analyzing the camera data object such as human persons, animals, or other objects. The gate monitoring unit can perform operations in response to the detection of an unauthorized vehicle, unauthorized occupant of a vehicle, or both. For example, the gate monitoring unit 818 notify a monitoring application server 890, a central alarm station server 892, or both, of the detection of an authorized vehicle, unauthorized vehicle occupant, or both.

In some implementations, the gate monitoring unit 818 may instead be hosted by the monitoring application server 890 as a gate monitoring unit 890a. In such instances, the monitoring application server 890 is configured to perform each of the operations described with reference to FIGS. 1, 2A-2D, 3A-3D, 4A, 4B, and 5-7 as being performed by the monitoring system control unit 810 or the monitoring application server 890. In yet other implementations, the monitoring application server 890 and the monitoring system control unit 810 may each host the gardening unit 890a, 818, respectively. In such instances, one or more of the operations described with reference to FIGS. 1, 2A-2D, 3A-3D, 4A, 4B, and 5-7 may be performed by the monitoring application server 890 and one or more of the operations described with reference to FIGS. 1, 2A-2D, 3A-3D, 4A, 4B, and 5-7 may be performed by the monitoring system control unit 810.

The network module 814 is a communication device configured to exchange communications over the network 805. The network module 814 may be a wireless communication module configured to exchange wireless communications over the network 805. For example, the network module 814 may be a wireless communication device configured to exchange communications over a wireless data channel and a wireless voice channel. In this example, the network module 814 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 814 also may be a wired communication module configured to exchange communications over the network 805 using a wired connection. For instance, the network module 814 may be a modem, a network interface card, or another type of network interface device. The network module 814 may be an Ethernet network card configured to enable the monitoring system control unit 810 to communicate over a local area network and/or the Internet. The network module 814 also may be a voiceband modem configured to enable the alarm panel to communicate over the telephone lines of Plain Old Telephone Systems (POTS).

The monitoring system that includes the monitoring system control unit 810 includes one or more sensors or detectors. For example, the monitoring system may include multiple sensors 820. The sensors 820 may include a contact sensor, a motion sensor, a glass break sensor, or any other type of sensor included in an alarm system or security system. The sensors 820 also may include an environmental sensor, such as a temperature sensor, a water sensor, a rain sensor, a wind sensor, a light sensor, a smoke detector, a carbon monoxide detector, an air quality sensor, etc. The sensors 820 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 820 may include a radio-frequency identification (RFID) sensor that identifies a particular article that includes a pre-assigned RFID tag.

The monitoring system control unit 810 communicates with the module 822 and the camera 830 to perform surveillance or monitoring. The module 822 is connected to one or more devices that enable home automation control. For instance, the module 822 may be connected to one or more lighting systems and may be configured to control operation of the one or more lighting systems. Also, the module 822 may be connected to one or more electronic locks at the property and may be configured to control operation of the one or more electronic locks (e.g., control Z-Wave locks using wireless communications in the Z-Wave protocol. Further, the module 822 may be connected to one or more appliances at the property and may be configured to control operation of the one or more appliances. The module 822 may include multiple modules that are each specific to the type of device being controlled in an automated manner. The module 822 may control the one or more devices based on commands received from the monitoring system control unit 810. For instance, the module 822 may cause a lighting system to illuminate an area to provide a better image of the area when captured by a camera 830.

The camera 830 may be a video/photographic camera or other type of optical sensing device configured to capture images. For instance, the camera 830 may be configured to capture images of an area within a building monitored by the monitoring system control unit 810. The camera 830 may be configured to capture single, static images of the area and also video images of the area in which multiple images of the area are captured at a relatively high frequency (e.g., thirty images per second). The camera 830 may be controlled based on commands received from the monitoring system control unit 810.

The camera 830 may be triggered by several different types of techniques. For instance, a Passive Infra Red (PIR) motion sensor may be built into the camera 830 and used to trigger the camera 830 to capture one or more images when motion is detected. The camera 830 also may include a microwave motion sensor built into the camera and used to trigger the camera 830 to capture one or more images when motion is detected. The camera 830 may have a "normally open" or "normally closed" digital input that can trigger capture of one or more images when external sensors (e.g., the sensors 820, PIR, door/window, etc.) detect motion or other events. In some implementations, the camera 830 receives a command to capture an image when external devices detect motion or another potential alarm event. The camera 830 may receive the command from the controller 812 or directly from one of the sensors 820.

In some examples, the camera 830 triggers integrated or external illuminators (e.g., Infra Red, Z-wave controlled "white" lights, lights controlled by the module 822, etc.) to improve image quality when the scene is dark. An integrated or separate light sensor may be used to determine if illumination is desired and may result in increased image quality.

The camera 830 may be programmed with any combination of time/day schedules, system "arming state", or other variables to determine whether images should be captured or not when triggers occur. The camera 830 may enter a low-power mode when not capturing images. In this case, the camera 830 may wake periodically to check for inbound messages from the controller 812. The camera 830 may be powered by internal, replaceable batteries if located remotely from the monitoring control unit 810. The camera 830 may employ a small solar cell to recharge the battery when light is available. Alternatively, the camera 830 may be powered by the controller's 812 power supply if the camera 830 is co-located with the controller 812.

In some implementations, the camera 830 communicates directly with the monitoring application server 890 over the Internet. In these implementations, image data captured by the camera 830 does not pass through the monitoring system control unit 810 and the camera 830 receives commands related to operation from the monitoring application server 890.

The system 800 further includes one or more robotic devices 880 and 882. The robotic devices 880 and 882 may be any type of robots that are capable of moving and taking actions that assist monitoring user behavior patterns. For example, the robotic devices 880 and 882 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 880 and 882 may be robotic devices that are intended for other purposes and merely associated with the monitoring system 800 for use in appropriate circumstances. For instance, a robotic vacuum cleaner device may be associated with the monitoring system 800 as one of the robotic devices 880 and 882 and may be controlled to take action responsive to monitoring system events.

In some examples, the robotic devices 880 and 882 automatically navigate within a property. In these examples, the robotic devices 880 and 882 include sensors and control processors that guide movement of the robotic devices 880 and 882 within the property. For instance, the robotic devices 880 and 882 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 880 and 882 may include control processors that process output from the various sensors and control the robotic devices 880 and 882 to move along a path that reaches the desired destination and avoids obstacles. In this regard, the control processors detect walls or other obstacles in the property and guide movement of the robotic devices 880 and 882 in a manner that avoids the walls and other obstacles.

In addition, the robotic devices 880 and 882 may store data that describes attributes of the property. For instance, the robotic devices 880 and 882 may store a floorplan and/or a three-dimensional model of the property that enables the robotic devices 880 and 882 to navigate the property. During initial configuration, the robotic devices 880 and 882 may receive the data describing attributes of the property, determine a frame of reference to the data (e.g., a home or reference location in the property), and navigate the property based on the frame of reference and the data describing attributes of the property. For example, a robotic device 880 or 882 can navigate from a charging station 870 or 872 to a gate opening, and capture camera data (e.g., video, images, audio, or the like). Further, initial configuration of the robotic devices 880 and 882 also may include learning of one or more navigation patterns in which a user provides input to control the robotic devices 880 and 882 to perform a specific navigation action (e.g., fly to an upstairs bedroom and spin around while capturing video and then return to a home charging base). In this regard, the robotic devices 880 and 882 may learn and store the navigation patterns such that the robotic devices 880 and 882 may automatically repeat the specific navigation actions upon a later request.

In some examples, the robotic devices 880 and 882 may include data capture and recording devices. In these examples, the robotic devices 880 and 882 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 880 and 882 to take and store a biometric sample that can be used to identify the person (e.g., a biometric sample with DNA that can be used for DNA testing).

In some implementations, the robotic devices 880 and 882 may include output devices. In these implementations, the robotic devices 880 and 882 may include one or more displays, one or more speakers, one or more projectors, and/or any type of output devices that allow the robotic devices 880 and 882 to communicate information to a nearby user. The one or more projectors may include projectors that project a two-dimensional image onto a surface (e.g., wall, floor, or ceiling) and/or holographic projectors that project three-dimensional holograms into a nearby space.

The robotic devices 880 and 882 also may include a communication module that enables the robotic devices 880 and 882 to communicate with the monitoring system control unit 810, each other, and/or other devices. The communication module may be a wireless communication module that allows the robotic devices 880 and 882 to communicate wirelessly. For instance, the communication module may be a Wi-Fi module that enables the robotic devices 880 and 882 to communicate over a local wireless network at the property. The communication module further may be an 800 MHz wireless communication module that enables the robotic devices 880 and 882 to communicate directly with the monitoring system control unit 810. Other types of short-range wireless communication protocols, such as Bluetooth, Bluetooth LE, Z-Wave, ZigBee, etc., may be used to allow the robotic devices 880 and 882 to communicate with other devices in the property.

The robotic devices 880 and 882 further may include processor and storage capabilities. The robotic devices 880 and 882 may include any suitable processing devices that enable the robotic devices 880 and 882 to operate applications and perform the actions described throughout this disclosure. In addition, the robotic devices 880 and 882 may include solid state electronic storage that enables the robotic devices 880 and 882 to store applications, configuration data, collected sensor data, and/or any other type of information available to the robotic devices 880 and 882.

The robotic devices 880 and 882 are associated with one or more charging stations 870 and 872. The charging stations 870 and 872 may be located at predefined home base or reference locations in the property. The robotic devices 880 and 882 may be configured to navigate to the charging stations 870 and 872 after completion of tasks needed to be performed for the monitoring system 800. For instance, after completion of a monitoring operation or upon instruction by the monitoring system control unit 810, the robotic devices 880 and 882 may be configured to automatically fly to and land on one of the charging stations 870 and 872. In this regard, the robotic devices 880 and 882 may automatically maintain a fully charged battery in a state in which the robotic devices 880 and 882 are ready for use by the monitoring system 800.

The charging stations 870 and 872 may be contact based charging stations and/or wireless charging stations. For contact based charging stations, the robotic devices 880 and 882 may have readily accessible points of contact that the robotic devices 880 and 882 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 880 and 882 may charge through a wireless exchange of power. In these cases, the robotic devices 880 and 882 need only locate themselves closely enough to the wireless charging stations for the wireless exchange of power to occur. In this regard, the positioning needed to land at a predefined home base or reference location in the property may be less precise than with a contact based charging station. Based on the robotic devices 880 and 882 landing at a wireless charging station, the wireless charging station outputs a wireless signal that the robotic devices 880 and 882 receive and convert to a power signal that charges a battery maintained on the robotic devices 880 and 882.

In some implementations, each of the robotic devices 880 and 882 has a corresponding and assigned charging station 870 and 872 such that the number of robotic devices 880 and 882 equals the number of charging stations 870 and 872. In these implementations, the robotic devices 880 and 882 always navigate to the specific charging station assigned to that robotic device. For instance, the robotic device 880 may always use changing station 870 and the robotic device 882 may always use changing station 872.

In some examples, the robotic devices 880 and 882 may share charging stations. For instance, the robotic devices 880 and 882 may use one or more community charging stations that are capable of charging multiple robotic devices 880 and 882. The community charging station may be configured to charge multiple robotic devices 880 and 882 in parallel. The community charging station may be configured to charge multiple robotic devices 880 and 882 in serial such that the multiple robotic devices 880 and 882 take turns charging and, when fully charged, return to a predefined home base or reference location in the property that is not associated with a charger. The number of community charging stations may be less than the number of robotic devices 880 and 882.

Also, the charging stations 870 and 872 may not be assigned to specific robotic devices 880 and 882 and may be capable of charging any of the robotic devices 880 and 882. In this regard, the robotic devices 880 and 882 may use any suitable, unoccupied charging station when not in use. For instance, when one of the robotic devices 880 and 882 has completed an operation or is in need of battery charge, the monitoring system control unit 810 references a stored table of the occupancy status of each charging station and instructs the robotic device to navigate to the nearest charging station that is unoccupied.

The sensors 820, the module 822, the camera 830, and the robotic devices 880 and 882 communicate with the controller 812 over communication links 824, 826, 828, 832, 862, 884, 886. The communication links 824, 826, 828, 832, 862, 884, and 886 may be a wired or wireless data pathway configured to transmit signals from the sensors 820, the module 822, the camera 830, the robotic devices 880 and 882, and the vehicle 860 to the controller 812. The sensors 820, the module 822, the camera 830, and the robotic devices 880 and 882 may continuously transmit sensed values to the controller 812, periodically transmit sensed values to the controller 812, or transmit sensed values to the controller 812 in response to a change in a sensed value.

The communication links 824, 826, 828, 832, 862, 884, and 886 may include a local network. The sensors 820, the module 822, the camera 830, the robotic devices 880 and 882, the vehicle 860, and the controller 812 may exchange data and commands over the local network. The local network may include 802.11 "Wi-Fi" wireless Ethernet (e.g., using low-power Wi-Fi 33 chipsets), Z-Wave, ZigBee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 890 is an electronic device configured to provide monitoring services by exchanging electronic communications with the monitoring system control unit 810, the one or more user devices 840, 850, and the central alarm station server 892 over the network 805. For example, the monitoring application server 890 may be configured to monitor events (e.g., alarm events) generated by the monitoring system control unit 810. In this example, the monitoring application server 890 may exchange electronic communications with the network module 814 included in the monitoring system control unit 810 to receive information regarding events (e.g., alarm events) detected by the monitoring system control unit 810. The monitoring application server 890 also may receive information regarding events (e.g., alarm events) from the one or more user devices 840, 850.

In some examples, the monitoring application server 890 may route alarm data received from the network module 814 or the one or more user devices 840, 850 to the central alarm station server 892. For example, the monitoring application server 260 may transmit the alarm data to the central alarm station server 892 over the network 805.

The monitoring application server 890 may store sensor and image data received from the monitoring system and perform analysis of sensor and image data received from the monitoring system. Based on the analysis, the monitoring application server 890 may communicate with and control aspects of the monitoring system control unit 810 or the one or more user devices 840, 850.

The vehicle 860 may be capable of autonomously navigating to a destination without the aid of a human person to operate the vehicle while navigating. For example, a human person may input one or more instructions such as a destination address, and instruct the autonomous vehicle to travel to the destination address. However, the human person would not drive the vehicle 860 to the destination address. Instead, the autonomous vehicle 860 may perform actions of driving and navigation using multiple cameras, multiple sensors, and one or more navigation systems. In some instances, the autonomous vehicle 860 may be configured to a manual mode. In such instances, though fully capable of navigating without human interaction, the autonomous vehicle 860 may be operated, in manual mode, by a human user. The vehicle 860 may include an automobile.

The vehicle 860 can include a network interface that enables the vehicle 860 to communicate with one or more other vehicles, one or more monitoring system control units 810, one or more monitoring application servers 890, one or more central alarm station servers, one or more other cloud-services hosted by one or more server computers, any other computer, or the like. For example, the monitoring application server 890 may host one or more cloud-based services that can be used to monitor operations at a property, the garage of a property, or one or more other properties that are subscribed to the monitoring services provided by the monitoring system provider. The monitoring application server 890 may include an application programming interface (API) that allows the monitoring application server 890 the vehicle 860, one or more other computers that can communicate with the vehicle 860, or both. Alternatively, or in addition, the API can be included in the monitoring system control unit 110.

The central alarm station server 892 is an electronic device configured to provide alarm monitoring service by exchanging communications with the monitoring system control unit 810, the one or more mobile devices 840, 850, and the monitoring application server 890 over the network 805. For example, the central alarm station server 892 may be configured to monitor alarm events generated by the monitoring system control unit 810. In this example, the central alarm station server 892 may exchange communications with the network module 814 included in the monitoring system control unit 810 to receive information regarding alarm events detected by the monitoring system control unit 810. The central alarm station server 892 also may receive information regarding alarm events from the one or more mobile devices 840, 850 and/or the monitoring application server 890.

The central alarm station server 892 is connected to multiple terminals 892*a* and 892*b*. The terminals 892*a* and 892*b* may be used by operators to process alarm events. For example, the central alarm station server 892 may route alarm data to the terminals 892*a* and 892*b* to enable an operator to process the alarm data. The terminals 892*a* and 892*b* may include general-purpose computers (e.g., desktop personal computers, workstations, or laptop computers) that are configured to receive alarm data from a server in the central alarm station server 892 and render a display of information based on the alarm data. For instance, the controller 812 may control the network module 814 to transmit, to the central alarm station server 892, alarm data indicating that a sensor 820 detected a door opening when the monitoring system was armed. The central alarm station server 892 may receive the alarm data and route the alarm data to the terminal 892*a* for processing by an operator associated with the terminal 892*a*. The terminal 892*a* may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 892*a* and 892*b* may be mobile devices or devices designed for a specific function. Although FIG. 8 illustrates two terminals for brevity, actual implementations may include more (and, perhaps, many more) terminals.

The one or more user devices 840, 850 are devices that host and display user interfaces. For instance, the user device 840 is a mobile device that hosts one or more native applications (e.g., the native surveillance application 842). The user device 840 may be a cellular phone or a non-cellular locally networked device with a display. The user device 840 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 840 may perform functions unrelated to the monitoring system, such as placing personal telephone calls, playing music, playing video, displaying pictures, browsing the Internet, maintaining an electronic calendar, etc.

The user device 840 includes a native surveillance application 842. The native surveillance application 842 refers to a software/firmware program running on the corresponding mobile device that enables the user interface and features described throughout. The user device 840 may load or install the native surveillance application 842 based on data received over a network or data received from local media. The native surveillance application 842 runs on mobile devices platforms, such as iPhone, iPod touch, Blackberry, Google Android, Windows Mobile, etc. The native surveillance application 842 enables the user device 840 to receive and process image and sensor data from the monitoring system.

The user device 850 may be a general-purpose computer (e.g., a desktop personal computer, a workstation, or a laptop computer) that is configured to communicate with the monitoring application server 890 and/or the monitoring system control unit 810 over the network 805. The user device 850 may be configured to display a surveillance monitoring user interface 852 that is generated by the user device 850 or generated by the monitoring application server 890. For example, the user device 850 may be configured to display a user interface (e.g., a web page) provided by the monitoring application server 890 that enables a user to perceive images captured by the camera 830 and/or reports related to the monitoring system. Although FIG. 8 illustrates two user devices for brevity, actual implementations may include more (and, perhaps, many more) or fewer user devices.

In some implementations, the one or more user devices 840, 850 communicate with and receive monitoring system data from the monitoring system control unit 810 using the communication link 838. For instance, the one or more user devices 840, 850 may communicate with the monitoring system control unit 810 using various local wireless protocols such as Wi-Fi, Bluetooth, Z-Wave, ZigBee, HomePlug (Ethernet over powerline), or wired protocols such as Ethernet and USB, to connect the one or more user devices 840, 850 to local security and automation equipment. The one or more user devices 840, 850 may connect locally to the monitoring system and its sensors and other devices. The local connection may improve the speed of status and control communications because communicating through the network 805 with a remote server (e.g., the monitoring application server 890) may be significantly slower.

Although the one or more user devices 840, 850 are shown as communicating with the monitoring system control unit 810, the one or more user devices 840, 850 may communicate directly with the sensors and other devices controlled by the monitoring system control unit 810. In some implementations, the one or more user devices 840, 850 replace the monitoring system control unit 810 and perform the functions of the monitoring system control unit 810 for local monitoring and long range/offsite communication.

In other implementations, the one or more user devices 840, 850 receive monitoring system data captured by the monitoring system control unit 810 through the network 805. The one or more user devices 840, 850 may receive the data from the monitoring system control unit 810 through the network 805 or the monitoring application server 890 may relay data received from the monitoring system control unit 810 to the one or more user devices 840, 850 through the network 805. In this regard, the monitoring application server 890 may facilitate communication between the one or more user devices 840, 850 and the monitoring system.

In some implementations, the one or more user devices 840, 850 may be configured to switch whether the one or more user devices 840, 850 communicate with the monitoring system control unit 810 directly (e.g., through link 838) or through the monitoring application server 890 (e.g., through network 805) based on a location of the one or more user devices 840, 850. For instance, when the one or more user devices 840, 850 are located close to the monitoring system control unit 810 and in range to communicate directly with the monitoring system control unit 810, the one or more user devices 840, 850 use direct communication. When the one or more user devices 840, 850 are located far from the monitoring system control unit 810 and not in range to communicate directly with the monitoring system control unit 810, the one or more user devices 840, 850 use communication through the monitoring application server 890.

Although the one or more user devices 840, 850 are shown as being connected to the network 805, in some implementations, the one or more user devices 840, 850 are not connected to the network 805. In these implementations, the one or more user devices 840, 850 communicate directly with one or more of the monitoring system components and no network (e.g., Internet) connection or reliance on remote servers is needed.

In some implementations, the one or more user devices 840, 850 are used in conjunction with only local sensors and/or local devices in a house. In these implementations, the system 800 only includes the one or more user devices 840, 850, the sensors 820, the module 822, the camera 830, and the robotic devices 880 and 882. The one or more user devices 840, 850 receive data directly from the sensors 820, the module 822, the camera 830, and the robotic devices 880 and 882 and sends data directly to the sensors 820, the module 822, the camera 830, and the robotic devices 880 and 882. The one or more user devices 840, 850 provide the appropriate interfaces/processing to provide visual surveillance and reporting.

In other implementations, the system 800 further includes network 805 and the sensors 820, the module 822, the camera 830, and the robotic devices 880 and 882 are configured to communicate sensor and image data to the one or more user devices 840, 850 over network 805 (e.g., the Internet, cellular network, etc.). In yet another implementation, the sensors 820, the module 822, the camera 830, and the robotic devices 880 and 882 (or a component, such as a bridge/router) are intelligent enough to change the communication pathway from a direct local pathway when the one or more user devices 840, 850 are in close physical proximity to the sensors 820, the module 822, the camera 830, and the robotic devices 880 and 882 to a pathway over network 805 when the one or more user devices 840, 850 are farther from the sensors 820, the module 822, the camera 830, and the robotic devices 880 and 882. In some examples, the system leverages GPS information from the one or more user devices 840, 850 to determine whether the one or more user devices 840, 850 are close enough to the sensors 820, the module 822, the camera 830, and the robotic devices 880 and 882 to use the direct local pathway or whether the one or more user devices 840, 850 are far enough from the sensors 820, the module 822, the camera 830, and the robotic devices 880 and 882 that the pathway over network 805 is required. In other examples, the system leverages status communications (e.g., pinging) between the one or more user devices 840, 850 and the sensors 820, the module 822, the camera 830, and the robotic devices 880 and 882 to determine whether communication using the direct local pathway is possible. If communication using the direct local pathway is possible, the one or more user devices 840, 850 communicate with the sensors 820, the module 822, the camera 830, and the robotic devices 880 and 882 using the direct local pathway. If communication using the direct local pathway is not possible, the one or more user devices 840, 850 communicate with the sensors 820, the module 822, the camera 830, and the robotic devices 880 and 882 using the pathway over network 805.

In some implementations, the system 800 provides end users with access to images captured by the camera 830 to aid in decision making. The system 800 may transmit the images captured by the camera 830 over a wireless WAN network to the user devices 840, 850. Because transmission over a wireless WAN network may be relatively expensive, the system 800 uses several techniques to reduce costs while providing access to significant levels of useful visual information.

In some implementations, a state of the monitoring system and other events sensed by the monitoring system may be used to enable/disable video/image recording devices (e.g., the camera 830). In these implementations, the camera 830 may be set to capture images on a periodic basis when the alarm system is armed in an "Away" state, but set not to capture images when the alarm system is armed in a "Stay" state or disarmed. In addition, the camera 830 may be triggered to begin capturing images when the alarm system detects an event, such as an alarm event, a door opening event for a door that leads to an area within a field of view of the camera 830, or motion in the area within the field of view of the camera 830. In other implementations, the camera 830 may capture images continuously, but the captured images may be stored or transmitted over a network when needed.

The invention claimed is:

1. A monitoring system for monitoring a property comprising:
   one or more processors; and
   one or more non-transitory computer storage media storing instructions that are operable, when executed by the one or more processors, to cause the one or more processors to perform operations comprising:
      obtaining, by the monitoring system, monitoring system data that is generated by one or more first monitoring system components that are installed at a property;
      determining, by the monitoring system and based on the monitoring system data, that a vehicle will automatically drive through a vehicle access point of the property while the vehicle is unoccupied;
      based on determining that the vehicle will automatically drive through the vehicle access point of the property while the vehicle is unoccupied, determining, by the monitoring system, that the vehicle access point of the property is to be monitored instead of determining that the vehicle access point of the property is not to be monitored;
      based on determining that the vehicle access point of the property is to be monitored instead of determining that the vehicle access point of the property is not to be monitored, using one or more second monitoring system components to monitor the vehicle access point of the property;
      determining, by the monitoring system and based on the monitoring system data, that at another time the vehicle will automatically drive through the vehicle access point of the property while the vehicle is occupied; and
      based on determining that the vehicle will automatically drive through the vehicle access point of the property while the vehicle is occupied, determining, by the monitoring system, that the vehicle access point of the property is not to be monitored instead of determining that the vehicle access point of the property is to be monitored.

2. The system of claim 1, wherein based on determining that the vehicle access point of the property is to be monitored instead of determining that the vehicle access point of the property is not to be monitored, using one or more second monitoring system components to monitor the vehicle access point of the property comprises:
    monitoring the vehicle access point for presence of another object.

3. The system of claim 1, wherein based on determining that the vehicle access point of the property is to be monitored instead of determining that the vehicle access point of the property is not to be monitored, using one or more second monitoring system components to monitor the vehicle access point of the property comprises:
    monitoring whether a human outside the vehicle passes through the vehicle access point.

4. The system of claim 1, wherein based on determining that the vehicle access point of the property is to be monitored instead of determining that the vehicle access point of the property is not to be monitored, using one or more second monitoring system components to monitor the vehicle access point of the property comprises:
    monitoring whether a human outside the vehicle passes through the vehicle access point while the vehicle access point is opened for the vehicle to drive through.

5. The system of claim 4, wherein based on determining that the vehicle access point of the property is to be monitored instead of determining that the vehicle access point of the property is not to be monitored, using one or more second monitoring system components to monitor the vehicle access point of the property comprises:
    monitoring whether a human outside the vehicle passes through the vehicle access point while the vehicle access point is opened for the vehicle to drive through with a camera while a motion sensor installed at the property is disabled.

6. The system of claim 1, wherein based on determining that the vehicle will automatically drive through the vehicle access point of the property while the vehicle is unoccupied, determining, by the monitoring system, that the vehicle access point of the property is to be monitored instead of determining that the vehicle access point of the property is not to be monitored comprises:
    determining that the monitoring system is in an armed state.

7. The system of claim 1, wherein determining, by the monitoring system and based on the monitoring system data, that the vehicle will automatically drive through a vehicle access point of the property while the vehicle is unoccupied comprises:
    determining the vehicle is returning home from dropping off a human person.

8. A computer-implemented method comprising:
    obtaining, by a monitoring system, monitoring system data that is generated by one or more first monitoring system components that are installed at a property;
    determining, by the monitoring system and based on the monitoring system data, that a vehicle will automatically drive through a vehicle access point of the property while the vehicle is unoccupied;
    based on determining that the vehicle will automatically drive through the vehicle access point of the property while the vehicle is unoccupied, determining, by the monitoring system, that the vehicle access point of the property is to be monitored instead of determining that the vehicle access point of the property is not to be monitored;
    based on determining that the vehicle access point of the property is to be monitored instead of determining that the vehicle access point of the property is not to be monitored, using one or more second monitoring system components to monitor the vehicle access point of the property;
    determining, by the monitoring system and based on the monitoring system data, that at another time the vehicle will automatically drive through the vehicle access point of the property while the vehicle is occupied; and
    based on determining that the vehicle will automatically drive through the vehicle access point of the property while the vehicle is occupied, determining, by the monitoring system, that the vehicle access point of the property is not to be monitored instead of determining that the vehicle access point of the property is to be monitored.

9. The method of claim 8, wherein based on determining that the vehicle access point of the property is to be monitored instead of determining that the vehicle access point of the property is not to be monitored, using one or more second monitoring system components to monitor the vehicle access point of the property comprises:
    monitoring the vehicle access point for presence of another object.

10. The method of claim 8, wherein based on determining that the vehicle access point of the property is to be monitored instead of determining that the vehicle access point of the property is not to be monitored, using one or more second monitoring system components to monitor the vehicle access point of the property comprises:
    monitoring whether a human outside the vehicle passes through the vehicle access point.

11. The method of claim 8, wherein based on determining that the vehicle access point of the property is to be monitored instead of determining that the vehicle access point of the property is not to be monitored, using one or more second monitoring system components to monitor the vehicle access point of the property comprises:
    monitoring whether a human outside the vehicle passes through the vehicle access point while the vehicle access point is opened for the vehicle to drive through.

12. The method of claim 11, wherein based on determining that the vehicle access point of the property is to be monitored instead of determining that the vehicle access point of the property is not to be monitored, using one or more second monitoring system components to monitor the vehicle access point of the property comprises:
    monitoring whether a human outside the vehicle passes through the vehicle access point while the vehicle access point is opened for the vehicle to drive through with a camera while a motion sensor installed at the property is disabled.

13. The method of claim 8, wherein based on determining that the vehicle will automatically drive through the vehicle access point of the property while the vehicle is unoccupied, determining, by the monitoring system, that the vehicle access point of the property is to be monitored instead of determining that the vehicle access point of the property is not to be monitored comprises:
    determining that the monitoring system is in an armed state.

14. The method of claim 8, wherein determining, by the monitoring system and based on the monitoring system data, that the vehicle will automatically drive through a vehicle access point of the property while the vehicle is unoccupied comprises:

determining the vehicle is returning home from dropping off a human person.

15. A non-transitory computer-readable medium storing software comprising instructions executable by one or more computers which, upon such execution, cause the one or more computers to perform operations comprising:

obtaining, by a monitoring system, monitoring system data that is generated by one or more first monitoring system components that are installed at a property;

determining, by the monitoring system and based on the monitoring system data, that a vehicle will automatically drive through a vehicle access point of the property while the vehicle is unoccupied;

based on determining that the vehicle will automatically drive through the vehicle access point of the property while the vehicle is unoccupied, determining, by the monitoring system, that the vehicle access point of the property is to be monitored instead of determining that the vehicle access point of the property is not to be monitored;

based on determining that the vehicle access point of the property is to be monitored instead of determining that the vehicle access point of the property is not to be monitored, using one or more second monitoring system components to monitor the vehicle access point of the property;

determining, by the monitoring system and based on the monitoring system data, that at another time the vehicle will automatically drive through the vehicle access point of the property while the vehicle is occupied; and based on determining that the vehicle will automatically drive through the vehicle access point of the property while the vehicle is occupied, determining, by the monitoring system, that the vehicle access point of the property is not to be monitored instead of determining that the vehicle access point of the property is to be monitored.

16. The medium of claim 15, wherein based on determining that the vehicle access point of the property is to be monitored instead of determining that the vehicle access point of the property is not to be monitored, using one or more second monitoring system components to monitor the vehicle access point of the property comprises:

monitoring the vehicle access point for presence of another object.

17. The medium of claim 15, wherein based on determining that the vehicle access point of the property is to be monitored instead of determining that the vehicle access point of the property is not to be monitored, using one or more second monitoring system components to monitor the vehicle access point of the property comprises:

monitoring whether a human outside the vehicle passes through the vehicle access point.

18. The medium of claim 15, wherein based on determining that the vehicle access point of the property is to be monitored instead of determining that the vehicle access point of the property is not to be monitored, using one or more second monitoring system components to monitor the vehicle access point of the property comprises:

monitoring whether a human outside the vehicle passes through the vehicle access point while the vehicle access point is opened for the vehicle to drive through.

19. The medium of claim 18, wherein based on determining that the vehicle access point of the property is to be monitored instead of determining that the vehicle access point of the property is not to be monitored, using one or more second monitoring system components to monitor the vehicle access point of the property comprises:

monitoring whether a human outside the vehicle passes through the vehicle access point while the vehicle access point is opened for the vehicle to drive through with a camera while a motion sensor installed at the property is disabled.

20. The medium of claim 15, wherein based on determining that the vehicle will automatically drive through the vehicle access point of the property while the vehicle is unoccupied, determining, by the monitoring system, that the vehicle access point of the property is to be monitored instead of determining that the vehicle access point of the property is not to be monitored comprises:

determining that the monitoring system is in an armed state.

* * * * *